(12) United States Patent
Studnitzer

(10) Patent No.: US 10,977,649 B2
(45) Date of Patent: *Apr. 13, 2021

(54) VIRTUAL PAYMENT PROCESSING SYSTEM

(71) Applicant: Chicago Mercantile Exchange Inc., Chicago, IL (US)

(72) Inventor: Ari Studnitzer, Northbrook, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/459,926

(22) Filed: Jul. 2, 2019

(65) Prior Publication Data

US 2019/0325447 A1    Oct. 24, 2019

Related U.S. Application Data

(63) Continuation of application No. 14/873,521, filed on Oct. 2, 2015, now Pat. No. 10,387,881.

(51) Int. Cl.
| | |
|---|---|
| *G06Q 40/00* | (2012.01) |
| *G06Q 20/40* | (2012.01) |
| *G06Q 20/38* | (2012.01) |
| *G06Q 20/42* | (2012.01) |
| *G06Q 40/02* | (2012.01) |

(52) U.S. Cl.
CPC ....... *G06Q 20/4014* (2013.01); *G06Q 20/383* (2013.01); *G06Q 20/385* (2013.01); *G06Q 20/42* (2013.01); *G06Q 40/02* (2013.01)

(58) Field of Classification Search
CPC .................................................. G06Q 20/4014
USPC ...................... 705/38, 44; 707/648; 714/15; 455/414.3
See application file for complete search history.

(56) References Cited

U.S. PATENT DOCUMENTS

| | | | |
|---|---|---|---|
| 6,993,507 B2 | 1/2006 | Meyer et al. | |
| 7,543,066 B2 | 6/2009 | Colasurdo et al. | |
| 8,831,979 B1 * | 9/2014 | Gerson | H04L 63/0421 455/414.3 |
| 8,935,187 B2 | 1/2015 | Higgins, Sr. et al. | |

(Continued)

FOREIGN PATENT DOCUMENTS

CA       2361489 A1    8/2000

*Primary Examiner* — Samica L Norman
(74) *Attorney, Agent, or Firm* — Lempia Summerfield Katz LLC

(57) ABSTRACT

A system, apparatus, and method for resolving a data transaction is provided in which data transactions are resolved by a hardware matching processor that identifies data transaction requests received from client devices over a data communication network, matches incoming transaction requests with previously received transaction requests, and, based thereon, transmits electronic data transaction results messages to the client device. An incoming data transaction request is received and a match is attempted with one or more previously received but not yet resolved data transaction requests. It is identified whether either the incoming data transaction request or the matching data transaction request are dependent on the resolution of another data transaction request and whether that dependent data transaction request has been resolved. The data transaction requests are resolved and/or stored based on the match and resolution of dependencies.

20 Claims, 15 Drawing Sheets

(56) References Cited

U.S. PATENT DOCUMENTS

| | | | |
|---|---|---|---|
| 9,852,463 B2 | 12/2017 | Mengerink et al. | |
| 9,996,830 B2* | 6/2018 | Lacoss-Arnold | G06Q 20/209 |
| 2004/0210476 A1 | 10/2004 | Blair et al. | |
| 2008/0222048 A1 | 9/2008 | Higgins et al. | |
| 2009/0108080 A1 | 4/2009 | Meyer et al. | |
| 2011/0196790 A1 | 8/2011 | Milne | |
| 2011/0233285 A1 | 9/2011 | Meyer et al. | |
| 2012/0191606 A1 | 7/2012 | Milne | |
| 2012/0209775 A1 | 8/2012 | Milne | |
| 2012/0278201 A1 | 11/2012 | Milne | |
| 2013/0062421 A1 | 3/2013 | Meyer et al. | |
| 2013/0282577 A1 | 10/2013 | Milne | |
| 2013/0332362 A1 | 12/2013 | Ciurea | |
| 2014/0053020 A1* | 2/2014 | Nair | G06Q 10/063 |
| | | | 714/15 |
| 2014/0129428 A1 | 5/2014 | Tyler et al. | |
| 2014/0222675 A1* | 8/2014 | Mao | G06Q 20/383 |
| | | | 705/44 |
| 2014/0236817 A1 | 8/2014 | Meyer et al. | |
| 2014/0279094 A1 | 9/2014 | Neighman et al. | |
| 2014/0279469 A1 | 9/2014 | Mendes | |
| 2014/0279472 A1 | 9/2014 | Caglayan et al. | |
| 2014/0279483 A1 | 9/2014 | Bridges et al. | |
| 2014/0310174 A1* | 10/2014 | Heeter | G06Q 30/06 |
| | | | 705/44 |
| 2016/0085639 A1* | 3/2016 | Abouzour | G06F 11/1471 |
| | | | 707/648 |
| 2017/0004563 A1* | 1/2017 | Noviello | G06Q 30/0633 |

* cited by examiner

VIRTUAL PAYMENT PROCESSING SYSTEM

CROSS REFERENCE TO RELATED APPLICATIONS

This application is a continuation under 37 C.F.R. § 1.53(b) of U.S. patent application Ser. No. 14/873,521, filed Oct. 2, 2015, now U.S. Pat. No. 10,387,881, the entirety of which is hereby incorporated by reference.

FIELD

The following disclosure relates to electronic payment transaction networks, and more particularly, to the resolution of a data transaction contingent on the resolution of another data transaction by a data transaction processing system.

BACKGROUND

Conventional electronic payment transaction networks provide a network for banks, credit card companies, merchants, and customers to complete transactions electronically. Merchants or customers may pay transaction fees for each transaction. Payment transactions using credit cards, for example, are carried out by the merchant obtaining the customer's sixteen digit primary account number (PAN), card security code (CSN), card verification value (CVV), expiration date, zip code and/or other identifying information of the customer. In order to obtain an authorization, the customer's account information is then transmitted across the electronic payment transaction network to the bank associated with the customer's card, then to a credit card company, and then back to the merchant. Following authorization, the merchant later submits purchases for payment. Merchants typically submit credit card purchases in batches to banks (often submitting the day's receipts at the close of the business day) in order to obtain the previously authorized purchase. Batched transactions are then routed through the card network to the appropriate credit card company. The credit card companies deduct interchange fees from each transaction and return the remaining amount back to the bank. The bank then deducts its own discount fee and sends the remaining amount to the merchant. The customer is then billed. Multiple days are typically required to complete the entire transaction, and the customer must provide the merchant with multiple types of identifying information that is sent over the merchant's network. These conventional networks resolve transactions using unified data transactions that combine the customer information and the merchant information into a single message that contains sufficient information for the payment processor to complete the transaction.

Payment transaction networks may include digital wallets that conduct transactions using smartphone software applications allowing customers to access multiple accounts (credit, bank, or loyalty accounts) without use of a physical credit card. The transaction information in a digital wallet transaction may be transmitted to the merchant, such as via near field communication (NFC) technology of the customer's smart phone or other client device in concert with a point-of-sale (POS) terminal or device. Alternative to the use of a smartphone software application and NFC, a user may be prompted at a merchant's POS device or online to enter the customer's digital wallet account information (such as an email address, username, or password) to complete a transaction. Online transactions may also be conducted using customer digital wallet account information or individual customer account information via websites associated with merchants. These conventional digital wallet transactions also combine customer information and merchant information into a unified transaction that is sent in for payment processing.

Some payment transaction networks include digital currency secured by cryptography. These digital currencies, often called cryptocurrency, provide means of conducting entirely electronic transactions. However, cryptocurrencies are high risk, decentralized forms of currency, limiting its capability of use in many merchant transactions. Virtual currency may be sent from one user to another by specifying an originating address, an amount, and a recipient address. Transaction history and account balances of each address are public.

DETAILED DESCRIPTION

Figure 1:
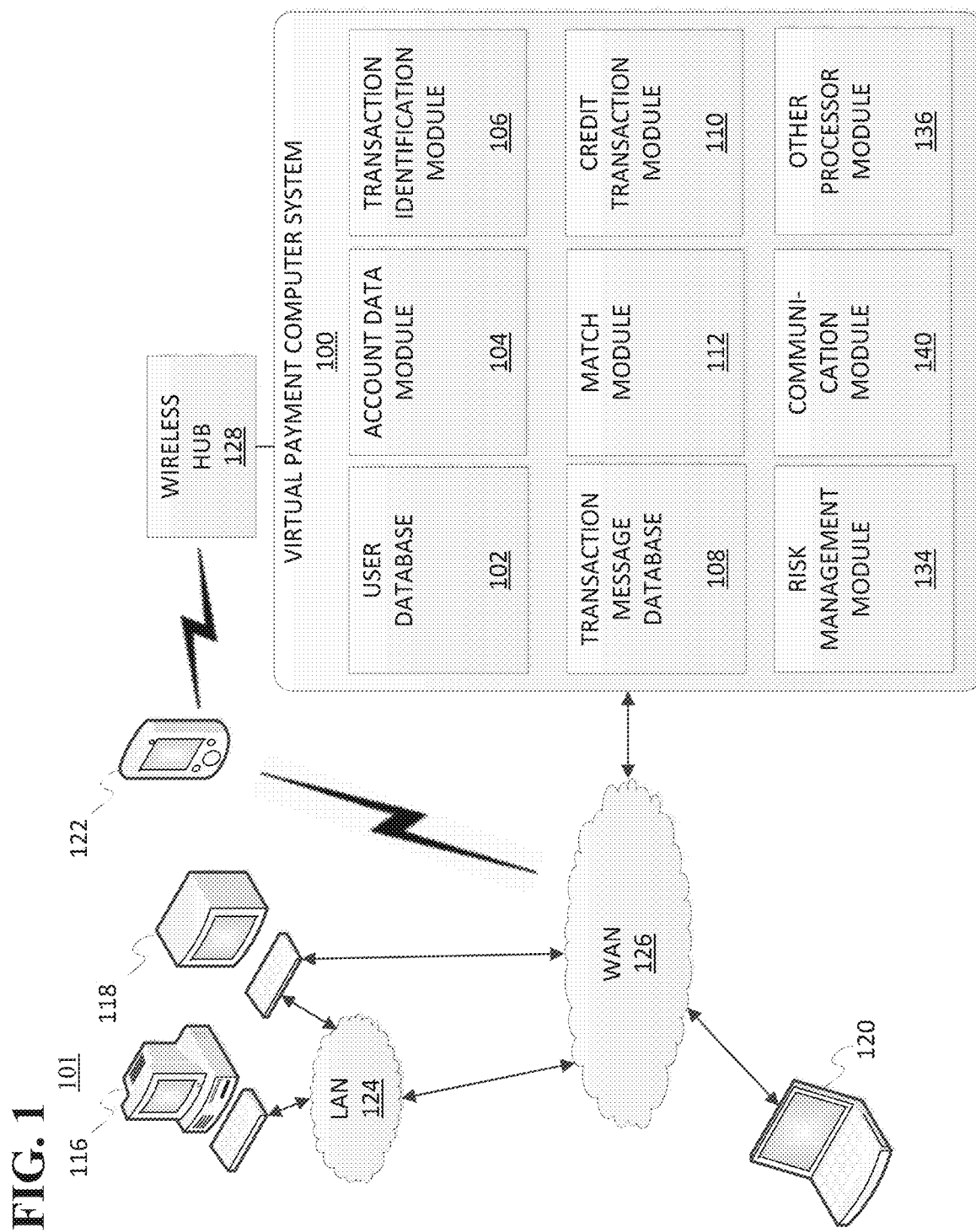
FIG. 1 depicts an illustrative computer network system that may be used to implement a data transaction processing system.

This application co-pends with U.S. Patent Applications entitled "Virtual Payment Processing System," filed on the same date, the entire content of which is incorporated herein by reference.

Operation of the disclosed embodiments may, as discussed below with respect thereto, include the operations/functions of registration, matching, match confirmation, offer dissemination/advertising, clearing, novation, settlement, margin/risk assessment, credit controls, netting, and offsetting. These functions may operate independently and/or in concert to implement the functionality described herein.

Generally, to participate in the disclosed virtual payment system, a participant, e.g. a user, an individual, a business, an entity, a customer, a consumer, buyer, merchant, seller, lender, creditor, borrower, etc., may register with the payment system such as via a registration processor or process which creates an account record, e.g. identifying the participant, and a position/account data structure or database in which will be stored data records representative of the one or more obligations and/or entitlements entered into by the associated participant, as will be described. Each account record and associated position data structure may be part of a larger account data structure maintained by the system for all of the participants. It will be appreciated that the data structures or arrangement thereof used to store participant account data may be implementation dependent. During the registration process, the participant may also link one or more fund accounts from which funds may be credited or debited by the system as will be described, e.g. bank accounts, credit accounts, or other accounts representative of cash or collateral holdings, including brokerage accounts, accounts receivable accounts, accounts payable accounts, etc., where in such funds may be denoted in any currency including US dollars, Euros, Yen, etc. as well as crypto or virtual currencies such as Bitcoin. Linking of at least one fund account holding a positive balance of funds may be required to register with the virtual payment system. Registration may be further contingent upon successful completion of a credit check, background check, identity check, or other administrative, legal and/or regulatory review, etc. It will be appreciated that as opposed, or in addition, to linking external funding accounts with the disclosed system, funds may be maintained on account with the system itself in one or more fund accounts associated with the participant and maintained by the system. In this case, the registration process may involve transferring sufficient funds to the participant's fund account.

The system may further provide one or more data structures or databases, referred to as a "transaction message database" or "offer database" in which incoming offers to transact submitted (i.e. via data transaction request messages) by a participant are stored if they are not fully satisfied, as will be described, by a previously received offer to transact at least partially counter thereto, to await subsequent receipt of one or more suitable matching counter transaction requests. A transaction message database may be provided for each type of transaction for which an offer/request may be submitted to the system. It will be appreciated, as will be described, that additional offer databases may be provided for various variations of transaction types as well. Each offer to transact (i.e., data transaction request), as will be described, includes a set of parameters for which an opposing or counter set of parameters of another offer to transact (i.e., data transaction request) must be matched in order to complete the transaction. A subset of those parameters may determine in which offer database the system is to look for a counter offer to transact. As such, the granularity of offer databases may be implementation dependent based on a subset of the transaction parameters, with the remainder of the transaction parameters being used by the system to match with a previously received counter transaction within the particular offer database.

Offers to transact/data transaction requests may include the following offer/transaction types:

Offer to pay: which may specify an amount to pay, a settlement date (or immediate settlement), and/or a transaction identifier. The amount to pay may be specified in a particular currency (and optionally an exchange rate or reference thereto) and/or may be specified as a base/principal amount and interest rate or net present amount.

Offer to be paid: which may specify an amount owed, a transaction identifier and/or a settlement date (or immediate settlement). The amount owed may be specified in a particular currency (and optionally an exchange rate or reference thereto) and/or may be specified as a base/principal amount and interest rate or net present amount.

Offer to lend: which may specify a maximum or fixed amount, a minimum interest rate (fixed or floating), currency, exchange rate or reference thereto, repayment/settlement terms, net present value, and/or a required borrower credit rating, as well as a funding account from which the funds will be provided.

Offer to borrow: which may specify a minimum or fixed amount, a maximum interest rate (fixed or floating), currency, exchange rate or reference thereto, repayment/settlement terms, and/or a borrower credit rating.

As will be appreciated, offers to pay and offers to be paid may be processed (matched and/or resolved), as discussed, by the system using a dedicated offer database while offers to borrow and offers to lend may be processed, as discussed, by the system using a separate offer database. Further, as was described above, multiple offer databases may be provided to process offers to lend and offers to borrow, such as an offer database for each of a plurality of credit rating ranges. It will further be appreciated that other transaction types may be provided and may include a transaction type which allows a participant to cancel or otherwise modify a previously submitted, not yet resolved, transaction.

Matching is the process by which the virtual payment system determines if a previously received offer is suitably counter to an incoming offer and, therefore, whether they can be resolved. Matching may be performed according to a matching algorithm which determines which parameters must match and in what manner they must match, e.g. equal to or greater than or equal to, etc. For example, for a basic payment transaction, an offer to pay must include an identical transaction identifier as an offer to be paid in order to match. Furthermore, the specified amount owed may be required to match the specified amount to be paid, etc. For credit transactions (e.g. offers to lend and offers to borrow), the specified repayment terms and credit rating may be required to match but the specified amount to be borrowed may be more or less than the specified amount to be lent. In the case where an incoming offer is not fully matched/satisfied (e.g. an offer to borrow up to $100 is matched with an offer to lend up to (or fixed) $50), the unsatisfied remainder of the incoming offer (e.g. now as an offer to borrow $50), is stored in the appropriate offer/transaction message database. Furthermore, where an incoming offer only partially satisfied a previously received offer (e.g. an incoming offer to borrow $100 is matched against a previously received offer to lend up to $200), the unsatisfied remainder of the previously received offer is left stored in the offer database (e.g. now as an offer to lend up to $100).

Where an incoming offer may match multiple previously received offers counter thereto but not all of these counter offers may be fully satisfied by the incoming offer, the matching algorithm may further include an allocation algorithm which determines how to allocate or otherwise distribute the incoming offer to or among one or more of the matching counter offers. This allocation algorithm may be, for example, first-in-first-out (FIFO), pro-rata or a combination thereof. For example, if an incoming offer to borrow $100 matches 4 previously received offers to lend $100, using a FIFO allocation, the earliest received counter offer to lend $100 may be selected to match with the incoming offer to borrow, whereby the remaining offers to lend remain in the offer database to await subsequently received suitable counter offers. Alternatively, using a pro rata allocation, each of the previously received offers to lend may be matched at $25 leaving the unsatisfied remainder of each of the four offers to lend in the offer database, i.e. now at $75 each. It will be appreciated that a participant may modify and/or cancel any such unsatisfied offers remaining in the offer database if they so choose prior to those offers being matched.

As will be further describe elsewhere, contingent matching algorithms may be implemented which allow participants to specify contingencies on which their offers are matched with other counter offers. Contingencies may include a requirement that another one or more offers be first matched before the present offer may be matched. For example, a participant may make an offer to pay or an offer to lend contingent on one or more offers to borrow first being matched. For example, an all-or-nothing contingency may be specified on an offer to lend wherein such an offer can only match a counter offer to borrow a minimum of the specified amount. Contingent data transactions may be pegged to currency values, ticks, bonds, or a combination. Contingent data transactions may be further pegged to best bid/offer. In one example, two incoming offers to lend of $100 may be received. One of the incoming offers may specify a $100 offer to lend with a floating rate pegged to EuroDollars one month contract plus 50 basis points. The other incoming offer may have the same terms, but may also be contingent on another the successful resolution of an offer to borrow $100 pegged to EuroDollars one month rate plus 25 basis points. When an incoming offer to borrow $100 matches, if the contingent offer has not been satisfied, the system will allocate based on available credit, i.e. allocating all of the $100 match to the non-contingent offer. Alternatively or additionally, the system may allocate first in first out (FIFO), pro-rata, or with a reservation price mechanism. As will be described herein, the match process may need to consider optimizations when matching an incoming transaction against previously received transactions upon which other previously received transactions are dependent.

Subsequent to the processing of an incoming offer/data transaction request, matching and updating of the requisite offer/transaction message databases, confirmation messages indicative of the result of the match process may be communicated to the participating or affected participants. Furthermore, data representative of the current/updated state of the affected offer databases may be communicated to all participants to make them aware of new offers to transact or changes to previously available offers to transact. This data may be anonymized such that the participants are unaware of which other participants submitted a particular offer to transact. By publishing the state of the offer databases to all participants, any of those participants may then submit a counter offer to transact with any previously received but unsatisfied transactions if they so choose. This effectively creates a "market" for those transactions.

While the matching process described above matches incoming offers to transact against previously received by not yet fully satisfied offers to transact stored in a particular offer database, it will be appreciated that other mechanisms may be provided by which matching previously received offers, or combinations of such offers, may be identified across different offer databases. This may be referred to as implied matching. Furthermore, mechanisms may be provided to analyze the state of multiple offer databases to determine whether a hypothetically received incoming offer would match with a combination of previously received offers from different offer databases wherein a synthetic offer is generated and published to all participants in an effort to solicit one or more participants into submitting the desired offer. This may be referred to as identification of implied opportunities.

Once a match between an offer to transact and counter offer to transact is identified, a clearing mechanism operates to remove the transacting offers from the associated offer databases (to the extent they are satisfied) and create positions in each transacting participant's position database representative of the obligation or entitlement entered into by the transacting party by virtue of the match of the offer and counter offer, effectively representing a binding agreement there between. While the creation of the positions in each position database may effectively represent a binding agreement between the transacting parties, the payment system, in its role as a central counter party, in fact novates itself into each transaction. In other words, as opposed to a binding transaction being created between the transacting participants, each position in fact represents a binding transaction between the participant and the payment system. In this way, neither transacting party need know the identity of the opposing participant nor do they need worry about the opposing participant's ability to perform their obligation. Instead, the payment system guarantees performance as to each participant and insures against failure to perform using risk management mechanisms as will be described.

The types of positions which may be created by the clearing mechanism include:

An "obligation to pay" which may be further characterized by an amount and settlement date (or immediate settlement) or range/set of settlement dates (for recurring or a sequence of payments), currency and/or exchange rate or reference thereto, and a funding account to take the funds from.

An "entitlement/obligation to be paid" which may be further characterized by an amount and settlement date (or immediate settlement) or range/set of settlement dates (for recurring or a sequence of payments), currency and/or exchange rate or reference thereto, and a funding account into which the funds are to be credited.

An "obligation to lend" which may be further characterized by an amount and settlement date (or immediate settlement or no settlement date if open ended) or range/set of settlement dates (for recurring or a sequence of payments), currency and/or exchange rate or reference thereto. The creation of an "obligation to lend" position may further link the specified funding account to the system so that the requisite funds may be debited upon settlement.

An "entitlement/obligation to borrow" which may be further characterized by an amount and settlement date (or immediate settlement) or range/set of settlement dates (for recurring or a sequence of payments), currency and/or exchange rate or reference thereto. The creation of an "entitlement to borrow" may further link a fund account with the participant's account from which the requisite funds may be credit to or otherwise drawn from upon settlement.

At defined time periods, such as at end of business day, hourly, or in real time as incoming transactions are processed, etc., a settlement process reviews all of the positions held by all of the participants and determines which of those positions are to be settled based on the specified settlement date of each. Settlement is generally the process by which funds are moved between the linked accounts of the participants to satisfy the particular obligations and entitlements as between the participant and the payment system. Settlement may result in the extinguishing of a fully satisfied obligation/entitlement and/or may create new obligation/entitlement positions. For example, where an obligation to pay a single fixed amount is settled, the requisite funds are debited from the specified linked account and the obligation may be extinguished. For an obligation to make a recurring payment, the payment may be deducted and the obligation adjusted to reflect the payment, i.e. to show the remaining balance due, next settlement date, etc. Similarly, where an entitlement to be paid a single fixed amount is settled, the payment may be credited to the specified linked fund account, and the position is then extinguished. Where the position is an obligation to lend, settlement may debit the specified loan amount from the specified linked account and generate a new position comprising an entitlement to be paid and characterized by the terms of the repayment. Where the position is an entitlement to borrow, settlement may credit the specified loan amount to a specified linked account and generate a new position comprising an obligation to pay characterized by the terms of the repayment. In one embodiment, upon settlement of a credit transaction, the entirety of the borrowed funds are debited from the lender's linked account and credited to the borrower's linked account with appropriate obligations to pay/entitlements to be paid being created in the respective accounts. In an alternate embodiment, partial access to the loaned funds may be provided for allowing a borrower to borrow funds as they need them, akin to a credit line, thereby creating an obligation to pay/entitlement to be paid as the funds are drawn and only to the extent they are drawn. In such an embodiment, the settlement process may be controlled by the borrower to direct when and how much is settled, such as a daily limit, a location-based based limit, etc., and, further, the payment system may maintain data records linking the obligation to lend with the obligation to borrow so as to account for the association between lender and borrower to appropriately credit/debit the accounts thereof as the funds are drawn upon.

As will be appreciated, a given participant may enter into numerous transactions and therefore, at any particular time, hold numerous combinations of the above described positions in their position databases. The system may further implement netting and offsetting mechanisms which analyze a participant's positions and determine when multiple positions may be netted together to effectively substitute a new single position that is equivalent, e.g. equivalent cash flow, to the multiple positions. This may be useful to simplify the participant's account by reducing the number of positions therein. When netting positions together, blending may be used to net interest based obligations to pay or entitlements to be paid such that the equivalent cash flow is achieved using a single blended interest rate for example. When a participant enters into opposing positions, such as an obligation to pay and similar entitlement to be paid, those positions may be offset against one another to a full or limited extent which may result in extinguishing one or more of offsetting positions. For example, where a participant holds multiple entitlements to be paid at various interest rates, they may net/blend those positions together into single position comprising an entitlement to be paid the total amount of the netted positions at a blended interest rate. The participant may then enter into a transaction to borrow that same amount but at a better interest rate thereby creating an obligation to pay in their account. The netted entitlement to be paid may then be offset by the obligation to pay resulting in a new entitlement to be paid the interest differential. This effectively allows a participant to securitize lending obligations. Similarly, using the same mechanisms, borrowers may consolidate loans.

As was discussed above, the virtual payment system acts as a central guarantor to guarantee performance of obligations by, and satisfaction of entitlements to, participants. In order to protect the system from the risk that a participant will fail to perform on their obligations, e.g. fail to make a payment they are obligated to make, fail to make funds available that they are obligated to lend, the system provides for a risk assessment/margin/guarantee fund process by which each participant's account is periodically evaluated to determine the potential risk of loss should that participant fail to perform on their presently held obligations. Risk assessment may be adjusted based on changes of credit rating of participants and the participants current obligations to pay. The participant may then be required to pay a margin amount to cover that risk of loss. If a participant's risk of loss goes down relative to a prior determination, the participant may receive a credit margin amount rather than being required to pay. In one embodiment, the system evaluates each participant's set of positions assuming that every position was to be settled at that moment and calculates the net amount that the participant would be required to pay. The netting and offsetting mechanisms described above may be applied to recognize nettable and offsettable positions. Furthermore, for time/interest based payments, net present values of those obligations may be computed. In one embodiment, the system may further apply any amounts on account in the linked fund accounts of the participants. Alternatively, or in addition thereto, a probability of the participant failing to perform on one or more of their obligations may be factored in and may be based, for example, of the participant's current credit rating, past performance history, etc. In particular, the system may compute a participant's risk of loss as a function of the magnitude of that participant's loss at a particular time of the determination, accounting for offsetting positions and the present market value of any positions that can be liquidated, as well as the magnitude of the probability of that loss, accounting for offsetting or correlated probabilities of loss of individual positions, participant credit rating/history, probability that obligations to be paid will or will not be satisfied (such as based on borrower credit ratings), etc. As such, the computed margin amount may be less than the actual loss value. This may further enable participants to leverage, e.g. by freeing up capital, a lower risk aggregate position in order to enter into additional transactions. Margin amounts may be deducted from/credited to a specified linked fund account. In addition to a margin requirement, participants who wish to engage in credit transactions may be required to contribute to a separate guarantee fund used to compensate for systemic losses caused by multiple participants failing to perform on their obligations. The magnitude of the guarantee funds required to be held on account, as well as the requisite contributions of the participants, may be statistically computed based on, for example, the results of periodically performed stress tests/simulated systemic loss scenarios.

It will be appreciated that using the above mechanisms of registration, matching, match confirmation, offer dissemination, clearing, novation, settlement, margin/risk assessment, netting, and offsetting, complicated financial transactions can be supported by the disclosed system while providing for the advantages described herein.

The disclosed embodiments relate to systems, apparatus, and methods of resolving a data transaction between parties, e.g., a purchase or credit transaction, using at least two separate messages received by the virtual payment processing system, one from each of the transacting participants, obviating the need for one party to receive sensitive account information from the other party. Separate messages are sent by each party and each message includes a transaction identifier unique to the transaction, e.g., a bar code or other identifying code, wherein one or both messages may further include data identifying details of the transaction. Upon receipt of a message, the disclosed embodiments determine whether a corresponding message has been received with an identical transaction identifier. If no identical transaction identifier has yet been received, the message is stored as a data record in a transaction message database. Upon receipt of a message with an identical transaction identifier, the transaction is resolved based on the data identifying details of the transaction from the complementary messages. A confirmation message may be sent to at least one of the transacting parties once a complementary message is received with an identical transaction identifier. As will be described in more detail below, when parties submit separate messages for the resolution of a transaction, the messages are received by a hardware processor coupled with a database or other data store, which contains data records indicative of previously received messages and data records associated with accounts of the transacting parties. The processor identifies data records of previously received messages having identical transaction identifiers, resolves the transactions, updates accounts of the transacting parties and may send confirmation to one or more party identifying that both messages have been received and/or that the transaction has been resolved.

The disclosed embodiments further relate to systems, apparatus, and methods of resolving data transactions by a data transaction processing system in which data transactions are resolved by a hardware matching processor that identifies data transaction requests received from client devices over a data communication network, matches incoming transaction requests with previously received transaction requests, and, based thereon, transmits electronic data transaction results messages to the client devices. An incoming data transaction request is received from a first client device of a first entity via the data communications network, the incoming data transaction request containing data indicative of an incoming data transaction; and an attempt to match the incoming data transaction request with a previously received but not yet resolved data transaction request is made, which is stored in a transaction message database coupled with the hardware matching processor, to at least partially resolve the incoming data transaction request and/or any matching previously received but not yet resolved data transaction requests. It is identified whether the resolution of the incoming data transaction request and/or any matching previously received but not yet resolved data transaction request is further dependent on resolution of another data transaction request, and further, it is determined whether that other data transaction request has been resolved. If the incoming data transaction request matches with a previously received but not yet resolved data transaction request and any identified other data transaction requests have been determined to be resolved, the incoming data transaction request is resolved with the previously received but not yet resolved data transaction request to at least partially resolve one or both of the incoming data transaction request and the previously received but not yet resolved data transaction request, and any unresolved remainder of the incoming data transaction request or of the matching previously received but not yet resolved data transaction requests are stored in the transaction message database. If no matching previously received but not yet resolved data transaction request is stored in the transaction message database or the identified other data transaction request has not been resolved, the incoming data transaction request is stored in the transaction message database.

A goal of the disclosed embodiments is to provide resolution of separate, i.e. decoupled, but transactionally related data transaction requests received asynchronously in time. A further goal of the disclosure is to provide resolution of data transaction requests by updating associated accounts substantially in real-time. A further goal of the disclosed embodiments is to provide security by resolving transactions without requiring participants, such as merchants, to obtain account identification information of other participants, such as customers. Still yet another goal of the disclosure is to provide a secure and efficient virtual payment system that minimizes transaction processing fees while providing an open network. A further goal is to reduce the number of entities that receive or transmit account or identity information to increase security of the transaction. The disclosed embodiments present improvements over existing technology by enabling real-time money movement to the end user and enables transactions for goods and services without the need for end user risk management. The disclosure provides the benefit of risk management of transactions of the goods and services by a centralized guarantor while reducing risk management for product delivery. Further benefits include enabling contingent relationships between data transaction providing linear optimization to optimize matches for the initiating participant.

An exemplary electronic payment transaction network 101 for resolving a data transaction request with a counter data transaction received asynchronously in time is shown in FIG. 1. The electronic payment transaction network 101 includes an virtual payment computer system 100 which receives electronic data transaction request messages and counter data transaction request messages, as well as the transaction identifiers contained thereon, and transmits electronic data transaction confirmation and/or failure messages. It will be appreciated that in bilateral or multilateral transactions, e.g. a sale of product having one or more buyers and one or more sellers or a credit transaction having one or more lenders and one or more borrowers, there are effectively at least two sides to the particular transaction, each counter to the other. As used herein, the term "counter" with reference to a data transaction request message is used to indicate the relationship of the particular data transaction request message to another data transaction request message and merely means that the particular request message was transmitted by, comprises data representative of, or is otherwise indicative of a particular side of a given transaction. Whether the transaction is a payment transaction having a buyer and seller or a lending transaction having a borrower and lender, either side of the transaction may be referred to by the term "counter" with respect to the other side of the transaction. Messages are transmitted and received via a data communications network, such as wide area network 126 and/or local area network 124 and client devices/computers 116, 118, 120 and 122, as will be described below, coupled with the virtual payment computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed. It will be appreciated that the messages described herein may be received simultaneously by participants, or temporally so close together as to be considered or perceived as being simultaneously received, for example, the difference in their time of receipt is too close to measure or otherwise discriminate among, also referred to as "substantially simultaneously". Accordingly, whether or not transactions may be considered to be received substantially simultaneously may be implementation dependent and depend upon the implemented resolutions or degree to which time of receipt of a transaction may be measured by the receiver, e.g. based on the implemented number of decimal places or number of bits used to delineate time of receipt, and/or implemented network collision handling mechanisms which arbitrate among multiple transactions, e.g. data packets, headers or the signals indicative thereof, received within a defined time window.

The virtual payment computer system 100 may be implemented with one or more mainframe, server, desktop or other computers, such as the computer 400 described below with respect to FIG. 15. A user database 102 may be provided which includes information identifying account holders of the electronic payment transaction network 101 (e.g. merchants, customers, lenders, borrowers, payors, payees, and other users of virtual payment computer system 100) such as account numbers or identifiers, user names and passwords. The user database 102 may additional store data records reflecting the value of accounts associated with the users. Account data for associated banking or credit accounts may be maintained by the respective banking or credit institution and communicatively coupled with, e.g. via a data communications network as described herein, the virtual payment system 100. Portions of the user database 102 associated with the account value of users may be referred to herein as the account database. Data records indicative of the value of an account may be updated reflecting debits and credits as part of resolving transactions between users. An account data module 104 may be provided which may process account information that may be used during virtual payment transactions. A transaction identification module 106 may be included in system 100 including a hardware transaction processor to determine identical transaction identifiers specified in data transaction request messages as will be described, and may be implemented with software that executes one or more algorithms for identifying data records of transaction messages with identical transaction identifiers and updating account data based on the resolution of transactions, transferring of funds in and out of the system, and credit transactions within the system. A transaction message database 108 may be included to store data records indicative of previously received data transaction requests and data records indicative of previously received counter data transaction requests. In particular, a transaction message database 108 may store data identifying the time and date that a message was received and may store data records representative of messages that do not have corresponding messages with identical transaction identifiers. The transaction message database 108 may further store data records indicative of paired transaction messages with identical transaction identifiers, previously received but not yet resolved data transaction requests, and data associated with completed transactions. In some embodiments, duplicative information present in paired transaction messages may be removed by the transaction processor to reduce processing times for searches within the database and for preservation of space in memory. For example, the records of the transaction message database 108 may remove identical transaction identifiers from its records once a message is paired. In another example, data records of paired transaction messages indicative of a transaction may be removed from the transaction message database 108 once the transaction has been resolved. The transaction message database 108, or other portions of memory of the virtual payment system 100, may include content-addressable memory (CAM). A credit transaction module 110 and/or match module may be included to compute or otherwise determine current bid and offer prices for available credit as will be described. Credit transaction module 110, match module 112, or any other module of system 100 may be a hardware processor of system 100. A risk management module 134 may be included to compute and determine a user's obligation to maintain a risk of loss amount or collateral in relation to the user's account value. Other processing module 136 may be included to decompose bulk order types for processing by the credit transaction module 110 and/or transaction identification module 106. A communication module 140 may be included to, among other things, control confirmation, failure, and other messages in accordance with one or more aspects of the disclosed embodiments. It will be appreciated that concurrent processing limits may be defined by or imposed separately or in combination, as was described above, on one or more of the virtual payment system components, including the user database 102, the account data module 104, the transaction identification module 106, the transaction message database 108, the credit transaction module 110, the risk management module 134, the communication module 140, other processing module 136, or other component of the virtual payment computer system 100.

The electronic payment transaction network 101 shown in FIG. 1 includes exemplary client/computer devices 116, 118, 120 and 122 of which depict different exemplary methods or media by which a computer/client device may be coupled with the virtual payment computer system 100 or by which a user may communicate, e.g. send and receive payment, credit, or other information therewith. It will be appreciated that the types of computer/client devices deployed by transacting parties and the methods and media by which they communicate with the data transaction processing system, e.g. the virtual payment computer system 100, is implementation dependent and may vary and that not all of the depicted computer/client devices and/or means/media of communication may be used and that other computer/client devices and/or means/media of communications, now available or later developed may be used. Each computer/client device, which may comprise a computer 400 described in more detail below with respect to FIG. 15, may include a central processor that controls the overall operation of the computer and a system bus that connects the central processor to one or more conventional components, such as a network card or modem. Each computer/client device may also include a variety of interface units and drives for reading and writing data or files and communicating with other computer/client devices and with the data transaction processing system/virtual payment computer system 100. Each computer/client device may implement the disclosed embodiments described herein to implement the disclosed transaction processing system and processes. Depending on the type of computer device, a user can interact with the computer with a keyboard, pointing device, touch screen, microphone, camera, sensor, pen device or other input device now available or later developed.

Exemplary computer/client devices 116 and 118 are coupled with a local area network (LAN) 124 which may be configured in one or more of the well-known LAN topologies, e.g. star, daisy chain, etc., and may use a variety of different protocols, such as Ethernet, TCP/IP, etc. The exemplary computer/client devices 116 and 118 may communicate with each other and with other computer and other devices which are coupled with the LAN 124. Computer and other devices may be coupled with the LAN 124 via twisted pair wires, coaxial cable, fiber optics or other wired and/or wireless media. As shown in FIG. 1, an exemplary wireless personal digital assistant device (PDA) 122, such as a mobile telephone, smartphone, tablet based computer device, or other wireless device, may communicate with the LAN 124 and/or the Internet 126 via radio waves, such as via WiFi, Bluetooth and/or a cellular telephone based data communications protocol. PDA 122 may also communicate with virtual payment computer system 100 via a conventional wireless hub 128.

FIG. 1 also shows the LAN 124 coupled with a wide area network (WAN) 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 15 and described below with respect thereto. One skilled in the art will appreciate that numerous additional computers and systems may be coupled to virtual payment computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer/client device 116 may include computer-executable instructions for receiving order information from a user and transmitting that order information to exchange computer system 100. In another example, the exemplary computer/client device 118 may include computer-executable instructions for receiving market data from exchange computer system 100 and displaying that information to a user in accordance with the disclosed embodiments as will be described below.

Of course, numerous additional servers, computers, handheld devices, personal digital assistants, telephones and other devices may also be connected to virtual payment computer system 100. Moreover, one skilled in the art will appreciate that the topology shown in FIG. 1 is merely an example and that the components shown in FIG. 1 may include other components not shown and be connected by numerous alternative topologies.

Figure 2:
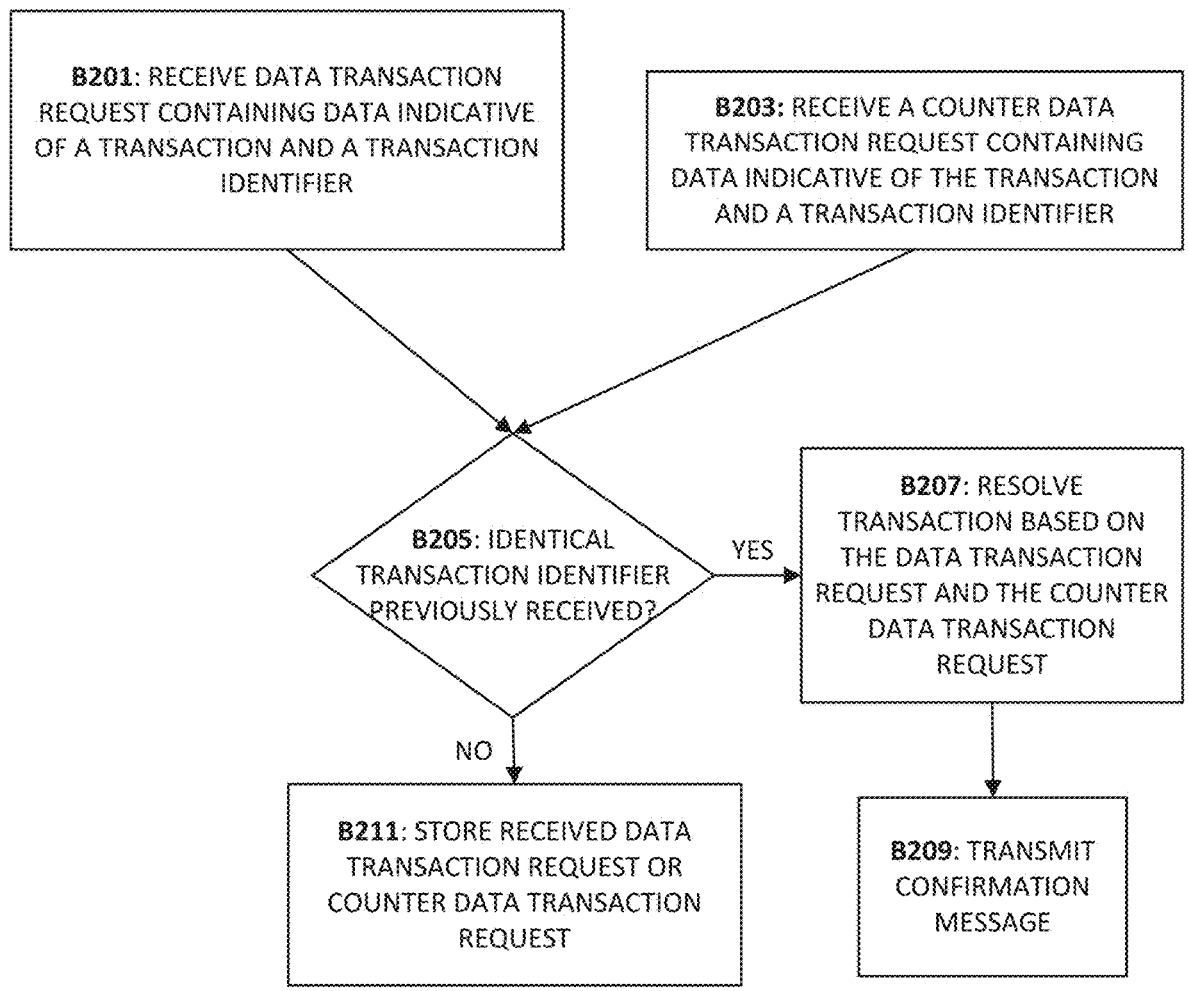
FIG. 2 is a flow diagram illustrating an example process of resolving a data transaction request with a counter data transaction request received asynchronously in time by a data transaction processing system.

As shown in FIG. 1, the virtual payment computer system 100 includes a communication module 140, transaction identification module 106, user data base 102, account data module 104, transaction identification module 106, transaction message database 108, credit transaction module 110, risk management module 134, or other processor module 136 and which may operate in conjunction with the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 is a flow diagram illustrating an example process of resolving a data transaction between a two transacting parties, the data transaction is separated into two messages, a data transaction request from the first transacting party and a counter data transaction request from the second transacting party. The requests may be sent by the transacting parties at different times and may also be received asynchronously in time by virtual payment system 100. FIG. 2, and the figures that follow, are described with respect to system components illustrated in FIG. 1. The blocks and stages illustrated in the figures are performed in the order shown or in different orders. Additional, different, or fewer blocks and/or stages may be provided.

In block B201, a data transaction request is received containing data indicative of the transaction and a transaction identifier. The data transaction request may be sent from a client device or computer 116, 118, 120 and 122 and may be sent from a POS terminal or device of a merchant. The data transaction is sent over network 124 or 126 and received by virtual payment computer system 100. The data transaction request may be representative of an accepted offer for purchase, sale, or credit and include data establishing the terms of the transaction. Data indicative of the transaction may include data such as a transaction agreement, an agreed value, an agreed present value, an interest rate, a value with an associated interest rate or a value with an associated generic index reference a date, a future date, time, a future time, a transaction expiration time, or data associated with contingent transactions. The data transaction request may include multiple types of additional data but may not carry identifying information of the other party in the transaction. The data transaction request, unlike conventional transactions, does not include identifying information regarding the method of payment or account information from the other party in the transaction.

Instead, a transaction identifier is included in the data transaction request that provides a unique identification of a transaction. The transaction identifier is generated by one of the parties participating in the transaction, shared with the other parties participating in the transaction, and sent to virtual payment computer system 100 as a part of each message so that messages for the same transaction may be identified by system 100. The transaction identifier may be represented as a one or two dimensional bar code such as a universal product code (UPS) or quick response code (QR code). The transaction identifier may alternatively or additionally include an alphanumeric code, image, randomly generated number, audible data stream such as dual-tone multi-frequency signaling, video stream, or other unique identifier. The transaction identifier may be generated by the client device generating the data transaction request and may be sent to the other party in the transaction via network 124 or 126. The transaction identifier may be played or generated for display by the client device generating the data transaction request and detected/recorded/captured by a sensor or entered via a peripheral device of the other party in the transaction. A merchant client device may require the entry of a username, password, personal identification number, code, and/or biometric information in order to generate a transaction request or transaction identifier as an additional measure of security.

Minimally, each transaction includes two messages to carry out a transaction using system 100 (e.g., a transaction data request and a counter data transaction request each including the same transaction identifier). At least two transaction messages are used for each transaction to provide security by removing the need for a customer to provide account identifying information directly to the merchant, furthering a goal of the disclosure. In block B203, a counter data transaction request is received containing data including data indicative of the transaction and the identical transaction identifier provided by the merchant. The transaction data may be an instruction to transmit funds in accordance with the terms of the transaction. The counter data transaction request is generated and sent by a client device 116, 118, 120 and 122 and may be sent from a purchaser/customer. The message may be sent over network 124 or 126 and received by virtual payment computer system 100. Additional data may be included in the counter data transaction request such as an agreed value, an interest rate, a date, a time, or a transaction expiration time. The counter data transaction request may include multiple types of additional data. A data transaction request and its counter data transaction request may have different types of additional data. For example, a data transaction request may include a transaction expiration time but its corresponding counter data transaction request may not include a transaction expiration time. The counter data transaction request includes an identical transaction identifier to the transaction identifier of the data transaction request. A purchaser client device may require the entry of a username, password, personal identification number, code, and/or biometric information in order to generate a transaction request or transaction identifier as an additional measure of security.

The counter data transaction request need not contain any identifying account information associated with a sender of the data transaction request. The data transaction request also need not contain any identifying account information associated with a sender of the data transaction request. The data transaction request and the counter data transaction request need not contain any identifying account information associated with the other party engaged the transaction. That is, the data transaction request may not contain identifying account information associated with the counter data transaction request and/or the counter data transaction request may not contain identifying information associated with the data transaction request. Data transaction requests, counter data transaction requests, and any other message sent to or from virtual payment computer system may be encrypted and authenticated before being sent over network 124 or 126. Data may be encrypted using public-key systems, symmetric-key systems, or other available methods.

In block B205, it is determined whether a data record indicative of an identical transaction identifier has been previously received. Virtual payment computer system 100 may use transaction identification module 106 to determine whether an identical transaction identifier has already been received and stored in transaction message database 108, credit transaction module 110, or another database of system 100. That is, upon receiving a data transaction request from a first client device via a network, it is determined whether a data store indicative of a counter data transaction having an identical transaction identifier has been previously received by the server/system 100. Upon receipt of a counter data transaction request, the server determines whether a data transaction request having an identical transaction identifier has been previously received by the server/system 100. A data transaction request and its corresponding counter data transaction request may be sent at substantially the same time and/or may arrive at virtual payment computer system 100 at substantially the same time.

Once a data record is found having an identical transaction identifier, the transaction may be immediately resolved, as will be described, based on the data transaction request and the counter data transaction request in block B207. Resolving the transaction may include transferring funds between an account associated with a sender of the data transaction request and an account associated with the sender of the counter data transaction request. That is, the account records of each of the transacting parties may be updated by account data module 104 to reflect a credit to the account records of the transacting party and a debit to the account records of the other transacting party. Resolution of the transaction may include creation of an obligation to pay and/or be paid in the appropriate participants account. Obligations may be settled at an established time, such as the end of the day, upon which time the money is moved, such as with a margin mechanism. Resolution of a transaction may include charging one or more fees to one, some, or all transacting parties. Transaction fees may be split between parties. Data records are updated in the user database to reflect a debit of transaction fee values to the account of one or more parties of the transaction. Resolution of transactions may include updating account records in a first currency associated with the account associated with the sender of the data transaction request and updating the account records associated with the sender of the counter data transaction request in a second currency. The value of the first currency and the second currency may be an equivalent amount in consideration of an exchange rate and may include an additional transaction fee. For example, a user having account records associated with US dollars may conduct a transaction in which the amount of the transaction in US dollars is paid to the other transacting party in an equivalent value in a second currency, such as Euros, as determined by an exchange rate. Additional transaction fees, such as a conversion fee, may be paid by one or both parties as part of the resolution of the transaction. Resolution of transactions by system 100 may occur upon pairing a transaction identifier of a data transaction request message with a counter data transaction request message having an identical transaction identifier. Alternatively, transactions may be resolved in a batch manner on a periodic basis, such as every five minutes, hourly, or daily.

A confirmation message may be sent in block B209. Confirmation messages may be generated and sent by communication module 140 of system 100 to one or more parties of the transaction. If a stored data record with an identical transaction identifier is found, but the expiration time has been exceeded, an error message may be sent to one or more of the transacting parties. Confirmation messages may be sent after identical transaction identifiers have been found but prior to the resolution of the transaction. Confirmation message may include information regarding each respective recipient's account information, such as an account balance, updated account value, loyalty rewards information, incentive information based on the transaction or other additional information. A confirmation message may include text, audio, video, or graphics and be sent via email, text message, SMS message, or any other method that may be received by client device 116, 118, 120, or 122.

Virtual payment system 100 may serve as guarantor for transactions that are confirmed prior to settlement of the transaction. Threshold account balances may be set for confirmed transactions based on a maximum transaction price, user specific details, or other criteria. A confirmation message may be sent prior to, after, or concurrently with the resolution of the transaction. Transaction processing speed may be improved by confirming a transaction before or simultaneous with resolution of the transaction. Upon matching of transaction identifiers, the virtual payment computer system 100 may additionally require confirmation of funding based on an account value or other criteria before transmitting a confirmation message. System 100 may determine the account value via an account data module 104 based on account information available in system 100 in the user database 102. Intermediate messages may be sent by communication module 140 to a transacting party if there are insufficient funds to complete the transaction. A failure message may not be immediately sent to the other transacting party. Instead, a notification may be sent to the party with insufficient funds. The notification may provide an opportunity for the transacting party to satisfy the deficiency such as by providing an additional funding source or obtain credit for the transaction from a third party through system 100. Upon securing credit and changing the account value to one that meets the funding requirements of the original transaction, the confirmation message may be then sent to the original transacting parties with or without identifying the additional credit transaction.

Upon determination by system 100 that no data transaction request with an identical transaction identifier has been received or upon determination that no counter data transaction request with an identical transaction identifier has been received, a data record containing data indicative of the respective request may be stored in a transaction message database 108 or in credit transaction module 110 of system 100 in block B211. A data transaction request in some embodiments may be transactions to pay, be paid, to borrow, or to lend.

The electronic payment transaction network 101 may be used by merchants (i.e., sellers) and buyers (i.e., customers) to complete purchase transactions using the example process of FIG. 2. In the purchase transaction paradigm, the transaction may occur in a brick and mortar store at a POS terminal or between a client devices of the merchant and the customer. Transactions may be conducted via the Internet with the merchant and the customer remotely conducting the transaction. The transaction may be the completion of a purchase. The merchant may be a business or an individual, and the customer may also be either an individual or business. The transaction may be conducted in real time. In the example of a POS terminal purchase transaction, the transaction may occur in real time to resolve an in-store purchase of goods and/or services. The transaction may also occur within a store for goods and/or services to be delivered at a future time. The data transaction request may be sent by the merchant and may represent a consummated agreement indicating that the customer has agreed to sell a product at a specific price, and the customer has agreed to make a purchase. Accordingly, at the point of sale, the merchant may ring up the sale at the POS terminal, thereby generating a transaction identifier that is scanned by the customer's client device or sent to the customer's client device over network 124 or 126. The merchant provides a data transaction request including the data indicative of the transaction and a transaction identifier through the electronic payment transaction network 101.

The transaction identifier sent by the merchant matches the transaction identifier generated for the customer. Data indicative of the transaction may include the price agreed upon by the merchant and the customer and may include transaction parameters such as the date and/or time of the transaction. The transaction may also include transaction parameters such an expiration for the transaction. A expiration for the transaction may be provided in the form of an expiration date and time, or in an amount of time following the time of sending of the request or in an amount of time following the receipt of the request by the server.

While the data transaction request may include the transaction identifier, merchant and customer may complete the transaction with system 100 without exchanging identifying information. Departing from conventional payment transactions, the merchant is not required to handle, store, or transmit any identifying information such as a credit card number or any information provided by the customer in order to complete the transaction. Accordingly, no identifying information of the customer needs to be stored or transmitted over the network by the merchant, furthering a goal of the disclosure. In some embodiments, identifying information such as age, driver's license number, or other personal identification as required by law may be required. A request for additional information may be received by the customer via confirmation message. Alternatively, the virtual payment system may send a request message requiring additional information may the additional information may be required in advance of confirmation of the transaction from the virtual payment system. The customer and merchant may resolve requests for identification information (e.g., showing of a driver's license) may be conducted independently of system 100. Alternatively, the customer may be provided such information independently through its own counter data transaction request to system 100 or may be associated with the user's account, and confirmation that additional customer identification requirements have been met may be provided to the merchant along with a message confirming the transaction. When additional information is of the customer is sent through system 100, a confirmation that additional customer identification requirements have been met may not include actual identification information of the customer, providing additional security.

The data transaction request sent by the merchant and the counter data transaction request sent by the customer are then sent via each respective client device to the electronic payment transaction network 101. Virtual payment computer system 100 then identifies the corresponding messages based on determining whether the transaction identifier from the data transaction request message from the merchant is identical to the transaction identifier of the counter data transaction request message from the customer. Even if the merchant and customer transmit corresponding messages at substantially the same time, the parties may send their respective messages over various networks, e.g., the merchant may be connected to the Internet via cable and the customer may be connected to the network over Wi-Fi or via mobile network. Accordingly, the system 100 may receive these messages at different times and in no particular order. The counter data transaction message may be received before the data transaction message or vice versa. The messages may also be asynchronously received if one of the two parties engaging in the transaction does not submit its data transaction request message or counter data transaction request message immediately. The messages may further be asynchronously received if the customer obtains credit through system 100 while at the POS of the merchant. Upon receipt of either a data transaction request for a counter data transaction request, the system 100 may determine whether a transaction identifier has been received previously by determining whether an identical transaction identifier is stored in transaction message database 108.

Upon receipt of the data transaction request the server may search transaction message database 108 for an identical transaction identifier amongst only counter data transaction requests. Similarly upon receipt of a counter data transaction request the server may look for identical transaction identifiers only amongst previously received data transaction request in transaction message database 108. Selectively searching transaction message database 108 may have the positive effect of reducing the processing time of transaction identification module 106 and increasing efficiency of virtual payment computer system 100. Upon determination of a data transaction request and a counter data transaction request with identical transaction identifiers, the virtual payment system 100 may then send a confirmation of the transaction to the merchant, the customer, or both. Once a data transaction request and a counter data transaction request with identical transaction identifiers have been identified, some or all of the data records associated with the data request message and the counter data transaction request message may be removed from the database 108. In advance of sending a confirmation message, additional information may be required from the customer's account. For example, the data records of the customer's account maybe checked to see if the customer has appropriate funds in his or her account before sending a confirmation message to the merchant and customer. Upon determination that identical transaction identifiers have been received, the data records of the merchant may be updated to indicate a credit in the amount of the transaction and the data records of the customer may be updated to indicate a debit in the amount of the transaction, thus resolving the transaction. The credit and debit associated with the resolution of the transaction may occur substantially simultaneously to the confirmation of additional information such as an account update for account balance maybe since to the customer merchant or both.

A confirmation message may serve as a receipt for the customer and may provide an indication to the merchant that the customer may take possession of the purchased goods or services. The customer may consent to transmitting account identifying information in the account user settings identifying account information may be sent to the merchant. For example, a purchase transaction may be conducted in which the merchant may shipping the purchased goods to the customer. Based on the customer's consent, a shipping address associated with the customer's account may be sent to the merchant along with the confirmation. Consent or selection of a shipping address may be included in the counter data transaction request.

A customer may consent to have his or her email address or customer loyalty information shared with merchants upon resolution of a transaction. Accordingly, the customer may then be added to an email list or other loyalty program and may receive offers and incentives based on the transaction. Even in embodiments in which additional customer information is transmitted to the merchant, financial account identifying information need not be transmitted to the merchant.

Return purchases may also be conducted via the electronic payment transaction network 101, with the transaction being a consummated agreement of the merchant to reverse, credit, or refund a previous transaction. The transaction identifier may be generated upon confirmation that the goods have been returned.

Figure 4:
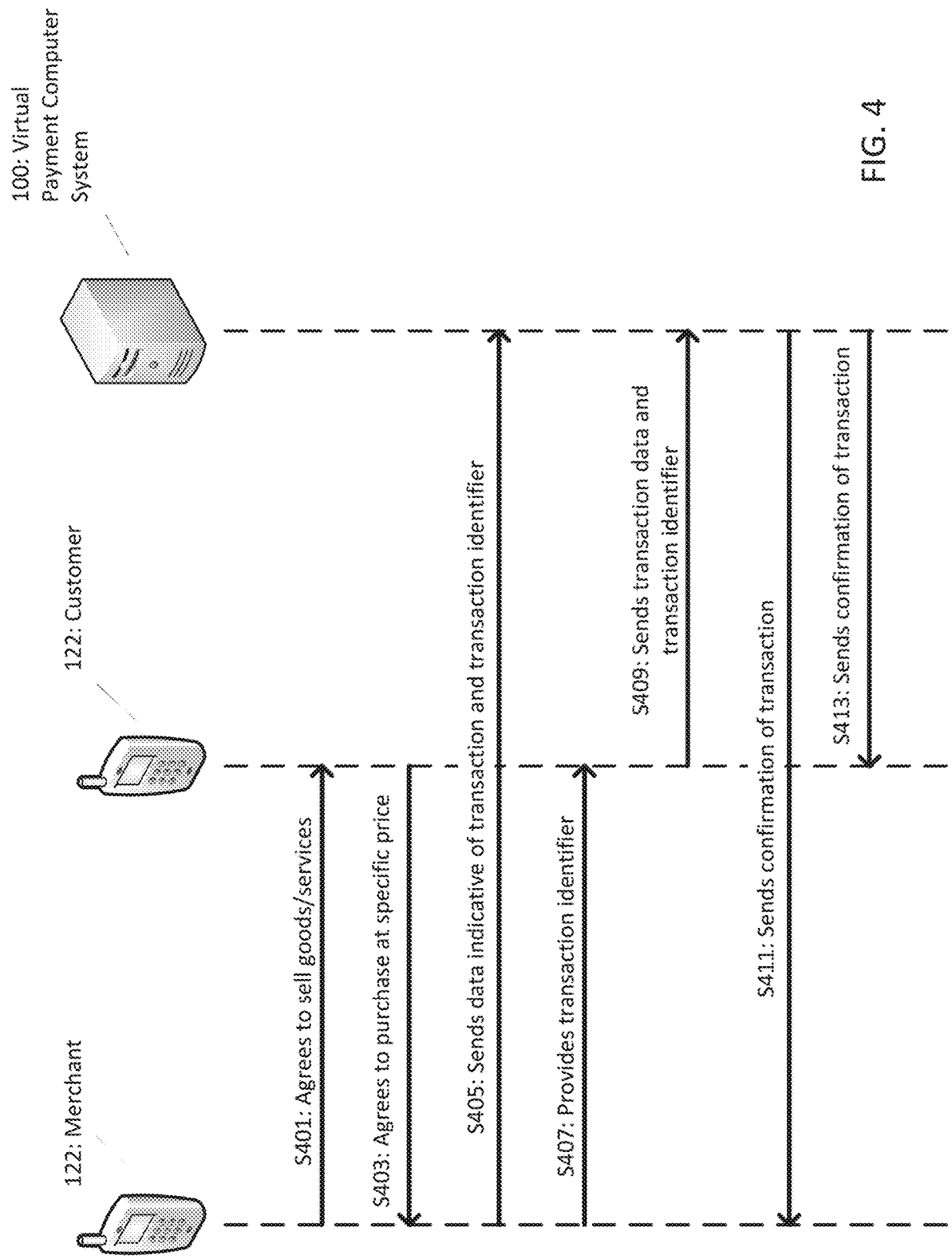
FIG. 4 is a diagram illustrating an example process of a purchase transaction in accordance with the data transaction processing system.

FIG. 4 is a diagram illustrating an example process of a purchase transaction in accordance with the data transaction processing system. The transaction may occur between one or more merchants 122 one or more customers 122 and the virtual payment computer system 100. The transaction may occur between one merchant 122 and multiple customers 122 or multiple merchants 122 and one customer 122. In stage S401, merchant 122 agrees to sell goods and/or services to customer 122. In stage S403, customer 122 agrees to purchase the goods or services at a particular price. Stages S401 and S403 may occur in person or over a network. In stage S405, merchant 122 since data including transaction data and any transaction identifier representing the agreement of stage S401 over a network to system 100. In stage S407, merchant 122 provides a transaction identifier to customer 122. Stage S407 may occur prior to or simultaneously with stage S405. Upon receipt of the transaction identifier by customer 122, customer 122 then sends instructions to pay to system 100 along with the transaction identifier received from merchant 122 in stage S409. Once system 100 has received both instructions to pay and the transaction data having the same transaction identifiers, system 100 sends confirmation of the transaction in stages S411 and S413. Virtual payment computer system 100 then deducts the purchase price from the user account of customer 122 and credits the user account of merchant 122, resolving the transaction. Resolution of the transaction may occur before, after, or substantially simultaneously to the sending of the confirmation of transaction. Confirmation messages sent to the merchant 122 and the customer 122 maybe send simultaneously, or one confirmation may be sent in advance of the other.

In one example, the purchase transaction is the settling of the bill at a restaurant with diners splitting the bill. The merchant/server provides a transaction identifier to each customer/diner. Each diner submits his share of the bill by sending transaction data and a transaction identifier. The transaction message sent by each diner matches some portion (but not all) of the data transaction request sent by the merchant. The system 100 may treat such transactions as partially resolving the data transaction request and may update the update the transaction message database 108 upon receipt of each payment. Updating the transaction message database may include reducing the total value of the outstanding payment reflecting the partial payment.

Upon full resolution of the data transaction request (receiving payment in full from multiple diners), the transaction is fully resolved and may be removed from the transaction message database 108 and/or logged in a completed transaction database that may be included as a portion of transaction message database 108.

Figure 5:
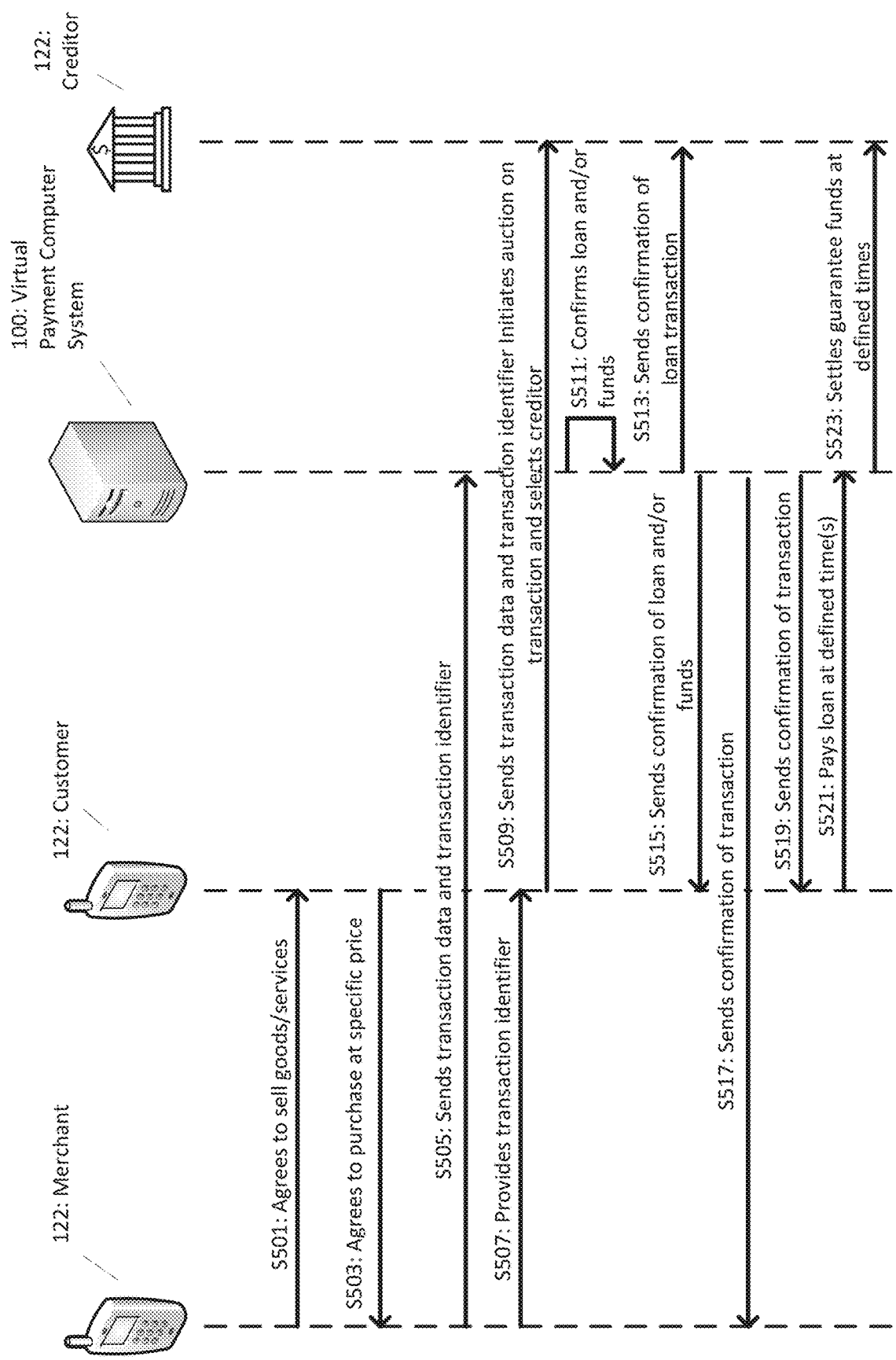
FIG. 5 is a diagram illustrating an example process of a credit based purchase transaction in accordance with the data transaction processing system.

FIG. 5 is a diagram illustrating an example process of a credit based purchase transaction in accordance with the data transaction processing system. Stages S501 through stages S507 are roughly identical to stages S401 through S407. In these initial steps the customer and merchant agree on a purchase price for a specific sale of goods and services upon receipt of the transaction identifier by customer 122. Customer 122 initiates an auction for the transaction and the virtual payment computer system 100 selects a creditor. The purchase price may be as same as the loan amount. Alternatively, some or all funds available in the customer 122 user of system 100 may be deducted from the purchase price before the loan amount is determined. The creditor maybe selected based on criteria established by creditors 122 and associated with each respective creditors in system 100. The selection of the creditor may be automated by system 100 by matching terms of the credit transaction that may include the amount of loan, interest rate, credit score of the customer or other criteria. In stage S511, system 100 confirms the loan and/or funds based on information available in user database 102 regarding customer 122 and creditor 122. Once the auction on transaction is concluded and a creditor is selected by system 100, the loan and/or funds are confirmed and stage S511. Following confirmation of the loan and/or funding available, virtual payment computer system 100 sends confirmation of the loan transaction in stage S513. Stages S509-S515 may occur in rapid succession, requiring no perceptible lengthening of time to complete the transaction compared to a transaction that is conducted with existing funds in the customer's account. System 100 sends confirmation of the loan and/or funds to the customer in stage S515. In stage S517, system 100 additionally sends confirmation of the transaction to merchant 122. In stage S519, confirmation of completion of the transaction is sent from system 100 to customer 122. Merchant 122 may not receive any information indicating that the transaction was completed using credit; that is, the credit portion of the transaction may be conducted entirely independent of the merchant. Merchant 122 may not receive an indication of the identity of customer 122 or the identity of any creditors 122. Stages S515, S513, S517, and S519 may be conducted simultaneously, substantially simultaneously, or in any order. Terms of the credit transaction may specify the manner and timing of repayment of the loan. Subsequent to the completion of the purchase transaction, customer 122 initiates loan payments based on the defined terms of the loan in stage S521. Multiple payments may be required, and payments may be made in different quantities. As system 100 receives instructions from customer 122 to pay each individual loan payment, system 100 settles guarantee funds at define times in stage S523.

Figure 3:
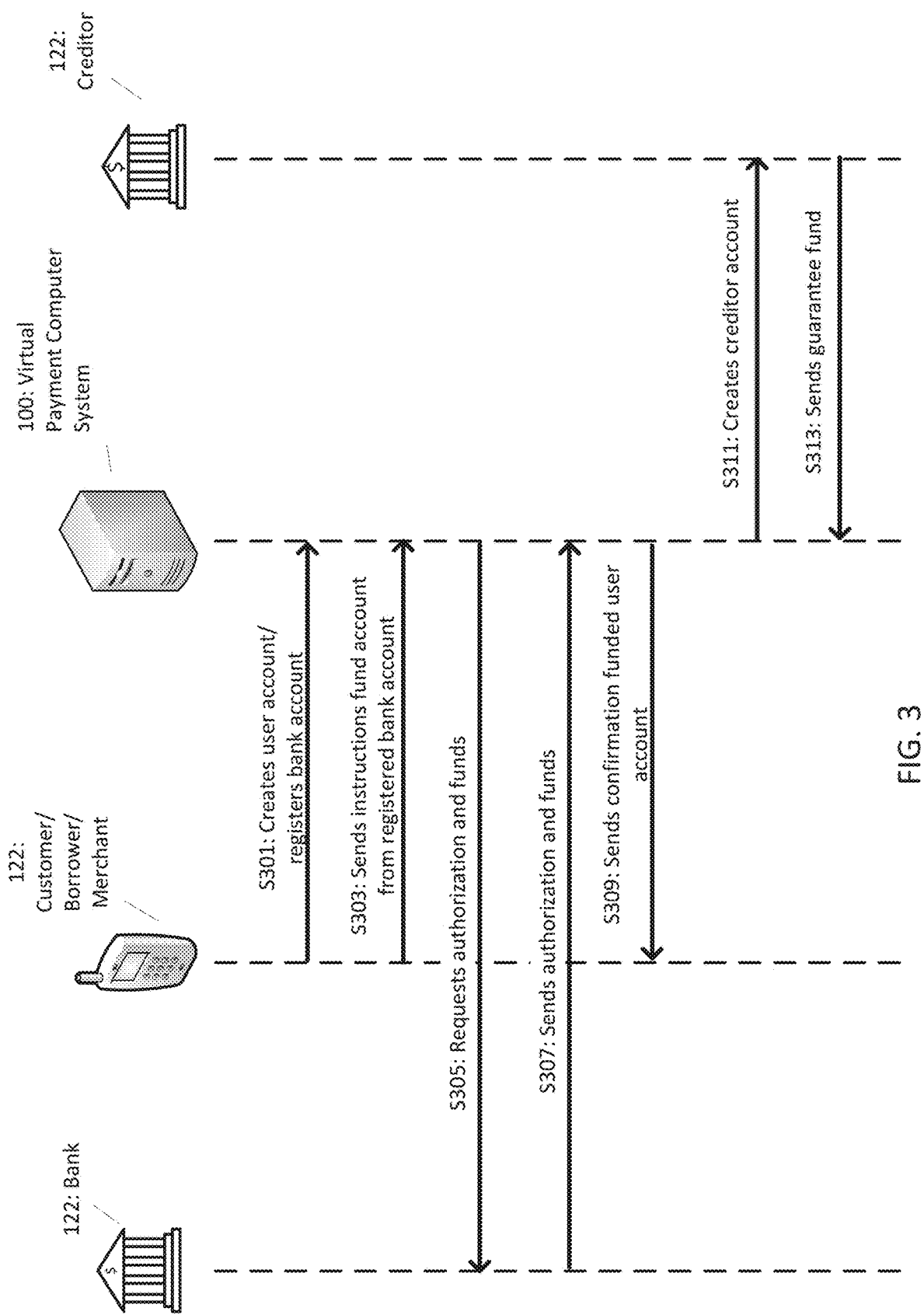
FIG. 3 is a diagram illustrating an example process of account registration in accordance with the data transaction processing system.

FIG. 3 illustrates an example process of account registration which may occur prior to a purchase transaction, a credit transaction or other type of exchange between multiple parties. Customers, borrowers, merchants, creditors, and banks may each create a user account or register an existing bank account or credit card or other type of financial account, such as a cryptocurrency account, with the virtual payment computer system 100 as shown in stage S301. An individual or business may have multiple user accounts with the virtual payment commuter computer system 100 or may have multiple bank accounts for credit card accounts registered for the same user account within the partial payment computer system 100. A user may provide bank account information associated with its user account information to facilitate repeated transfers. Tax information, personal identification information, credit information, or other types of personal or financial information may be entered by the user or maybe obtained automatically based on previously entered information and stored as data in user data base 102. Credit ratings or other information may be updated or obtained periodically by system 100 over network 124 or 126 so as to allow acceptance and/or confirmation of credit offers or other transactions upon selection by the user without additional inquiry into the user's credit rating, assets, or credit history.

The user account may have a username, password, personal identification number, code, biometric information, for other security features allowing the user to login to access the account or to use features of the virtual payment computer system without entering additional identification information. User information such as a driver's license number birthday, Social Security number, loyalty information associated with merchants, membership information or other types of information maybe additionally stored and associated with the user account. Data records indicative of user account information may be stored in the user database 102 of virtual payment computer system 100. Data records of user accounts may be updated by the user at any time. System 100 may prompt the user to update user account information periodically or based on events such as the expiration of a credit card associated with the user account. Messages requesting updated information may be generated by communication module 140 and sent to a client device associated with the user. The user may access his account via client device 116, 118, or 120 through a wired or wireless network connection.

As used herein, the terms user, participant, customer, consumer, merchant, seller, buyer, creditor, borrower, debtor, bank, payor, or payee encompass their plain and/ordinary meanings, including, but not limited to the use of the terms to describe an entity represented by data records indicative of user accounts of system 100. Any of these entities may be associated with an individual or business. An entity may serve one or more different roles in different transactions. For example, an entity may be a customer in one transaction and a creditor in another, or a merchant may be a seller and a creditor in a single transaction. User accounts may be associated with specific client devices such as a personal computer or a smart phone. An entity may conduct transactions over networks 124 or 126. An entity may conduct transactions via one or more client devices 116, 118, 120 or 122. Verification measures such as a user login, password, personal identification number, code, or biometric information may be required in order to access some or all features of the virtual payment computer system 100. Additional security measures may be based on the location of the client device, and the system 100 may identify the geolocation of the client device and determine whether a risk of fraud exists if the account is accessed by client devices in geographic locations exceeding a geofence and/or if the account is accessed in outside of a geographic area within a time period threshold. Individuals within an entity, such as employees of a business, may have individual, unique verification measures associated with a single entity's user account.

In stage S303, the customer, borrower, or merchant 122 sends instructions to fund the newly created user account from the register bank account. In stage S305, virtual payment computer system 100 requests authorization and funds from the specified registered bank account 122. In stage S307, bank 122 sends authorization and funds in response to the request to the virtual payment computer system 100. In stage S309, the system 100 sends a confirmation message to customer, borrower, or merchant 122 indicating that the newly created user account has been created. Creditor 122 may similarly create a user account with system 100 as shown in stages S103-S309, except the exchange of information and funds maybe obtain between creditor 122 and system 100 instead of between customer, borrower, or merchant 122 and system 100. In stage S311, creditor 122 may send a guarantee fund as part of funding the account in stage S313. The guarantee fund may be held by system 100 to provide real-time payment of credit transactions. Customer, borrower, or merchant 122 may also create an ongoing credit relationship with a creditor 122 through virtual payment computer system 100. An ongoing credit relationship may mean access to instantaneous credit at the point of sale and may be limited by additional terms including a maximum per day, or maximum credit amount. Additional credit terms may be stored as data records in user database 102, and the account value of the user may be adjusted based on the status of the user's account with respect to the terms of an ongoing credit relationship. A user of virtual payment computer system 100 may have multiple creditor accounts associated with a single user account. A creditor or borrower may maintain an anonymous relationship outside a virtual payment computer system 100, or the identity of one or both parties maybe known to the other. That is, credit may be offered and accepted within virtual payment computer system based on the terms of the credit without the identity of the borrower or creditor being provided in the transaction.

The value of each account of the virtual payment computer system 100 may be expressed as the state of the user's current transactions taking into account the existing funds, credit, debt, and obligations associated with the account in virtual payment computer system 100. The value of a user account may be a data store of user database 102 and determined by account data module 104 of system 100. Accounts of the senders of transaction requests and senders of counter data transaction request may each have an account value including one or more funds, an obligation to pay, an obligation to be paid, an obligation to loan, or an obligation to receive a loan, an instruction to pay, an instruction to be paid, an instruction to loan, or an instruction to receive a loan. The account value may be expressed as a portfolio of positions based on outstanding obligations to pay and be paid that are associated with the account. The value of an account holder's account value may be based on offsetting obligations to pay with obligations to be paid. Obligations to pay may also be offset with funds deposited in the account. For example, an account with outstanding obligations to pay, such as accounts payable, may offset sources of funds in the determination of the account value. An account with outstanding obligations to be paid, such as accounts receivable, may be considered as an asset in determining the account value. Accounts with both obligations to pay and obligations to be paid may offset one another in determining the account value. Data stores in transaction message database 108 may be consolidated or eliminated by system 100 if redundant obligations to pay and obligations to be paid are created.

The account value may further include a risk of loss measure based on the account value. The risk of loss may be the overall value of the account's obligations to pay offset by the accounts obligations to be paid measured at a moment in time, such as at the close of a business day, and risk of loss may be evaluated on a periodic basis. Risk of loss amount, margins, collateral, or a guarantee fund may be held in a separate database, such as risk management module 134 of virtual payment system 100. Each user account may be required to establish and/or maintain a minimum risk of loss amount of funds upon account registration. The minimum risk of loss amount required by each user may change over time based on the current risk of loss of the user. The user may be prompted to transfer any additionally required risk of loss amounts or may be automatically withdrawn. Alternatively, a user may be restricted from engaging in credit transactions until a minimum risk of loss amount is established. The risk of loss amount may be determined based on a risk associated with the user, a transaction, or a combination. The risk of loss amount may fluctuate based on the transaction history of the user. Some transactions may require confirmation of a threshold risk of loss amount or guarantee fund present in the user account before providing confirmation of transaction. Some transactions may require a specified risk of loss minimum balance based on a percentage or other function of the purchase price or transaction amount. Guarantee funds/risk of loss amount may be withdrawn from a user's account by system 100 in the event of non-payment of a past due or delinquent obligation of the user. The risk of loss measure may be based on historical credit volatility information. The guarantee fund may additionally be used to provide real-time transactions while reducing risk to system 100. Delayed payment transactions, such as credit transactions or delayed sales, may require a specified risk of loss amount for the transaction. A threshold risk of loss amount may be determined as a number greater than the risk of loss of the existing account value. A threshold risk of loss amount may additional account for the risk of loss of the pending transaction. Additional approval or confirmation may also include confirmation of a threshold amount of funds associated with the user's account value. Before a confirmation is sent, the server may determine whether the account value of the sender of the counter data transaction request meets a minimum balance threshold and if the minimum balance threshold is met. If the minimum balance threshold is not met, a failure message may be transmitted instead of a confirmation message. The account value of the sender of the counter data transaction request and the account value of the sender of the data transaction request based on the resolved transaction may be updated substantially contemporaneously with resolving the transaction. A user may have an open obligation, similar to an equity line, providing a user with the ability to take money as needed on a credit basis, subject to previously determined limits and/or terms. An open obligation may constitute a position or may be considered in determining the account value of a user. Upon completion of a loan transaction, the borrower's account value may immediately reflect the additional spending capabilities of the borrower. The lender's new obligation to be paid then reduces the spending or lending capabilities of the lender's account value.

Funds within the system 100, such as the risk of loss account funds or other designated funds within a user's account, may be eligible to accrue interest. Virtual payment computer system 100 may provide for payment of interest at a rate based on based on the account value, account balance, or other criteria associated with an account. A user may specify a portion of the user account that may be allocated as a lending pool to become a creditor within the system 100.

Interest may be paid by system 100 based on a lending pool amount. The user may select parameters such as interest rates, acceptable risk of default, or other parameters that system may use to present credit offers to users. Lending pool amounts may be divided or collectively offered by system 100 comporting with the terms established by each individual user account.

Electronic payment transaction network 101 may incorporate one or more credit markets based on transaction requests and offers stored in transaction message database. A single credit market may be established based on data specifying parameters in transaction requests and offer messages such as minimum credit rating, interest rate, repayment periods, maximum loan amount or other criteria. Data transaction requests and counter data transaction requests may be sent by parties seeking to conduct credit transactions. Credit transactions may be sought, matched, and completed via electronic payment transaction network 101 based on the requested terms or offered terms of credit without identifying or specifying another party with which to conduct the transaction. Accordingly, system 100 may act as a central counterparty/guarantor. Requests for credit and offers for credit may be described herein as data transaction requests and counter data transaction requests. The requests may include data specifying the terms of the requested or offered credit. A match engine, such as credit transaction module 110 may operate independently of transaction identification module 106. Requests associated with requested or offered credit may include data indicative of a minimum credit rating, interest rate, repayment periods, maximum loan amounts, and the like. Additionally or alternatively, multiple credit markets may be separated based on credit rating may be established using multiple transaction message databases and/or credit transaction modules 110 separated based ranges of credit ratings or other criteria.

Data transaction requests and counter data transaction requests may consist of credit offers or credit requests and may be stored in transaction message database 108. Credit transaction module 110 or match module 112 may match data transaction requests and counter data transaction requests associated with credit transactions based on requests stored in transaction message database 108. If no counter data transaction request meeting the terms of a data transaction request is available, the unmatched request may be stored in transaction message database and may be searchable by some or all users. A partial match may occur if the offer to lend matches the offer to borrow, but the maximum amount of the loan exceeds the amount of the request to borrow. Some data transactions may include terms that allow the data transaction to be resolved only if all portions of the data transaction are matched. Any unsatisfied portion of the offer of credit may be stored in the transaction message database. An offer for credit may match with more than one request for credit, in which case, if the amount of the loan is enough to satisfy the request loan amounts of all of the matching offers to borrow, all requests for credit are matched. If the incoming offer for credit is not sufficient to satisfy all of the matching requests to borrow, a prioritization scheme may be implemented such as first in first out (FIFO) or pro rata.

A transacting party wishing to borrow money submits a transaction request for credit specifying the terms (credit rating, a maximum acceptable interest rate the transacting party is willing to pay, acceptable repayment terms such as a maximum monthly payment, loan amount, expiration date by which the credit is requested, and the like). Credit transaction module 110 receives the offer and attempts to match it with a previously received but unsatisfied offer to lend stored in the transaction message database 108. If no match is made, the offer to borrow is stored in the transaction message database 108 and advertised out to some or all of the users. As with offers for credit, partial matches may occur or the incoming offer to borrow may be matched with multiple offers to lend in order to completely resolve the data transaction offer to borrow (e.g., reach the desired loan total).

Once a credit request is matched with one or more offers for credit, the credit transaction is resolved by updating the data records of the user database 102 for each transacting party. The account of the transacting party is updated to reflect the new position requesting credit, indicating an obligation to repay that may include one or more settlement dates and payment amounts according to the matched transaction terms. Alternatively, obligations to repay may be created as separate positions/data records for each repayment, with each repayment having a different settlement date. The system 100 may analyze the positions created by each obligation of the account holder. The system may determine whether multiple obligations share the same participants. The positions may be net and/or offset to reduce the number of positions. Blending (such as netting interest) may be used to create a single position that replaces multiple positions in the transaction message database and associated with the account holder. The account holder may be prompted by system 100 to accept or reject the blending of positions into a single obligation, or blending may be performed automatically. They system 100 may provide a consolidation discount or may ask one or more lending participants to agree to lower rates to facilitate the netting/offsetting of positions. Because the system 100 may act as the central guarantor for the transactions, rather than individual participants, the system is enabled to net or offset positions that share only one common participant. The account records of the transacting party obtaining the credit are further updated to indicate the availability of the borrowed funds. In this manner a creditor may enter into multiple transactions and retain the same cash flow by entering obligations to be paid that are equal to its obligations to borrow. Participants may hold multiple repayment positions that may be blended together at one interest rate, and enter an opposing position to lend at a higher interest rate. This type of transaction may profit the creditor by enabling it to "sell" loans because the creditor may itself be able to qualify for better rates through aggregation of its positions.

Anonymity and the provision of a central counter party provided by system 100 may prevent and eliminate the need for participants to know whether multiple obligations exist between the same participants. In fact, only the central counter party, system 100, may be capable of implementing the consolidation of multiple loans between the same participants and/or identify nettable/offsettable positions. In contrast to over the counter/bilateral systems where the transacting parties know each other, participants of the central counter party system 100 may not be capable of consolidating multiple loans or otherwise netting or offsetting positions.

In one embodiment, the terms of the credit transaction may specify a future date on which or by which to credit the borrower's account. The transacting party's account lending the funds may be debited immediately, the lender may be required to post margin, the lender may be required to deposit funds, borrow, or otherwise obtain a minimum account value, or otherwise guarantee the obligation to lend.

The minimum account value required by system 100 to lend funds may be based on funds obtained through credit and may be offered to lend in a subsequent transaction. In one embodiment, the account records of the borrower may not reflect available funds in the entire amount of the requested credit until the borrower enters into a separate purchase transaction through system 100, with repayment dates based on the date of the separate purchase transaction. In some cases, the actual amount borrowed may be determined by the amount of the purchase (up to an agreed maximum credit amount); repayment amount or the repayment dates may be based on the actual amount borrowed. The account records of the transacting party providing the credit may be updated to indicate the obligation to be repaid and may be updated indicating a debit in the amount of the loan provided to the other transacting party.

Figure 7:
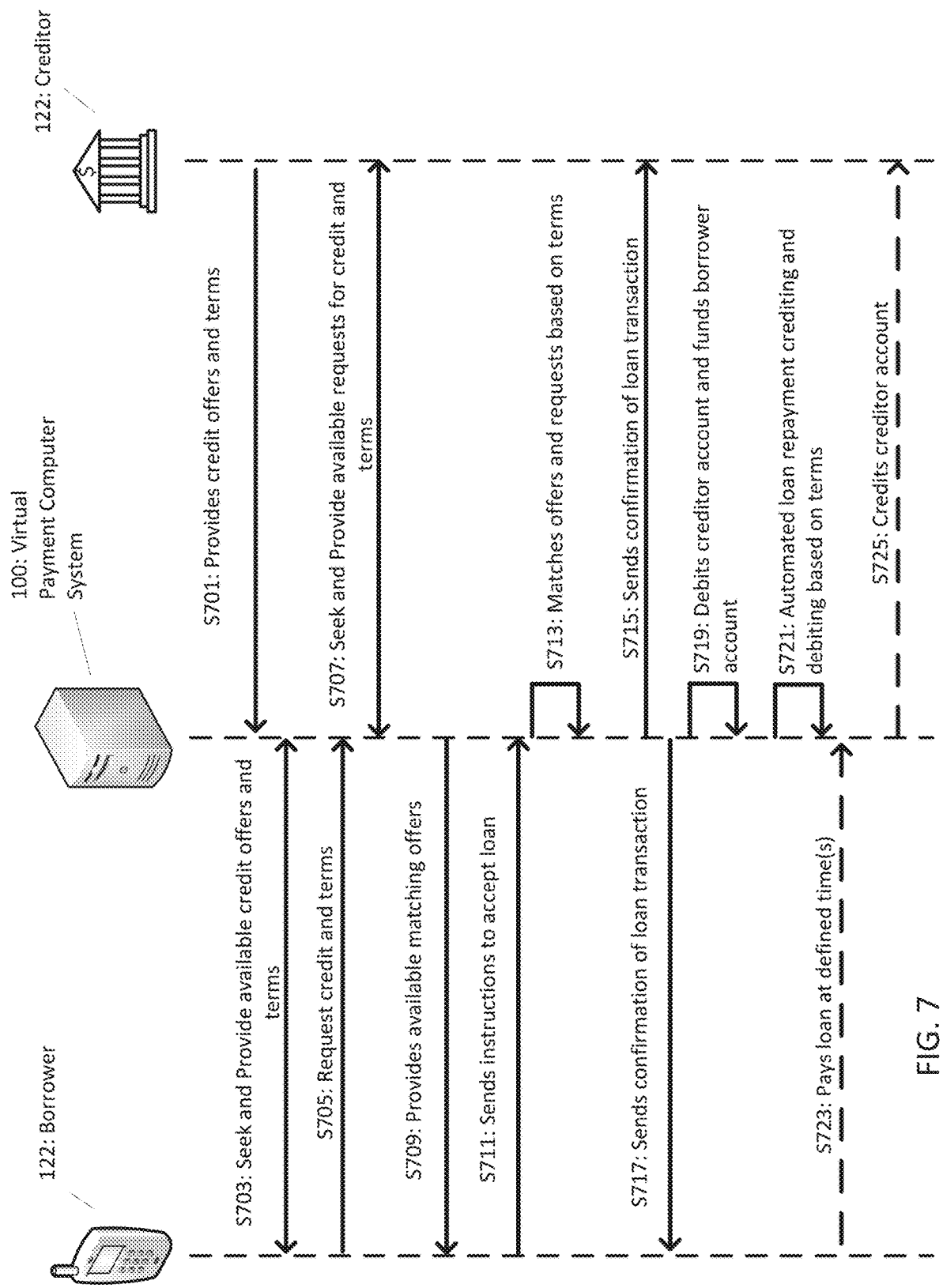
FIG. 7 is a diagram illustrating an example process of a credit transaction in accordance with the data transaction processing system.

FIG. 7 is a diagram illustrating an example process of a credit transaction in accordance with the electronic payment transaction network 101. Creditors 122 may solicit credit offers and terms to virtual payment computer system 100 in stage S701. The credit offer may be characterized by a maximum amount of credit, a minimum amount of credit, a specific amount of credit, an interest rate, and/or a minimum credit rating. An offer for credit may additionally include parameters allowing the offer to be accepted by multiple borrowers. Incentives or other offers may be provided based on an amount of credit, credit rating, or time period. Different terms of a credit offer may be provided based on a characteristic of the borrower, such as credit rating. The offer for credit may be associated with a transaction through system 100 or may be an offer for credit that is not associated with any other transaction. The credit offers may be maintained on transaction message database 108 and matched with incoming requests for credit by credit transaction module 110. Credit offers and requests for credit may be matched by credit transaction module 110 with any requesting user meeting the criteria of the loan terms. The creditor soliciting the offer may specify whether other creditors 122 are able to view offers stored on transaction message database 108. The solicited credit offers may be immediately create a binding agreement upon acceptance by a borrower 122 only if and when the borrower 122's account meets specified criteria as stored in system 100, if the borrower 122 has requested credit matching the criteria specified in the solicited offer. A request for credit (such as a request for quote) may also immediately create a binding agreement upon acceptance by a creditor 122. In some embodiments, a solicited credit offer or request for credit may not be immediately binding upon matching with a complementary request or offer and may require an additional confirmation by the party initiating the transaction before the credit transaction is binding. This process provides the benefit of time efficiency by avoiding an application and approval process after the borrower 122 accepts an offer for credit. The creditor's terms may include a minimum credit rating, an interest rate, a value with an associated generic index reference such as the London Interbank Offered Rate (Libor) or other interest rate index, and a minimum and/or maximum loan amount. An offer of credit may be expressed as a series of ranges based on one or more terms. For example, the interest rate and/or loan amount may vary based on the credit rating of the borrower 122 (for example, the interest rate for an offer for credit may be lower for individuals within a higher range of credit scores, or different multipliers for an interest rate index may be offered corresponding to ranges of credit scores). In stage S703, borrowers 122 may seek credit offers from virtual payment computer system 100. Virtual payment computer system 100 may provide open credit offers to borrower 122 upon request. The borrower 122 may select one or more offers of credit in stage S705. A borrower 122 may additionally solicit offers of credit and specify terms or a range of acceptable terms in stage S709. In stage S711, borrower 122 sends instructions to accept the loan. The transaction may be binding on the parties immediately upon borrower 122's acceptance. In stage S713, system 100 matches offers and requests based on the terms established in previous stages. In stage S715, system 100 sends confirmation of the loan transaction to creditor 122. System 100 sends confirmation of the loan transaction in stage S717 to borrower 122. System 100 debits the creditors account for the amount of the loan and funds the borrower account in stage S719. Based on the terms established the loan automated loan repayment, the loan may be repaid automatically in stage S721 without further instruction by borrower 122 via system 100. Additionally or alternatively, borrower 122 sends funds to pay the loan at predetermined times based on the loan terms. Borrower 122 may provide repayment of the loan to virtual payment computer system 100, and in stage S725 virtual payment computer system 100 credits creditor 122's account. Because the credit transaction occurs through system 100, one or both of the participants in the credit transaction that may remain anonymous.

Figure 8:
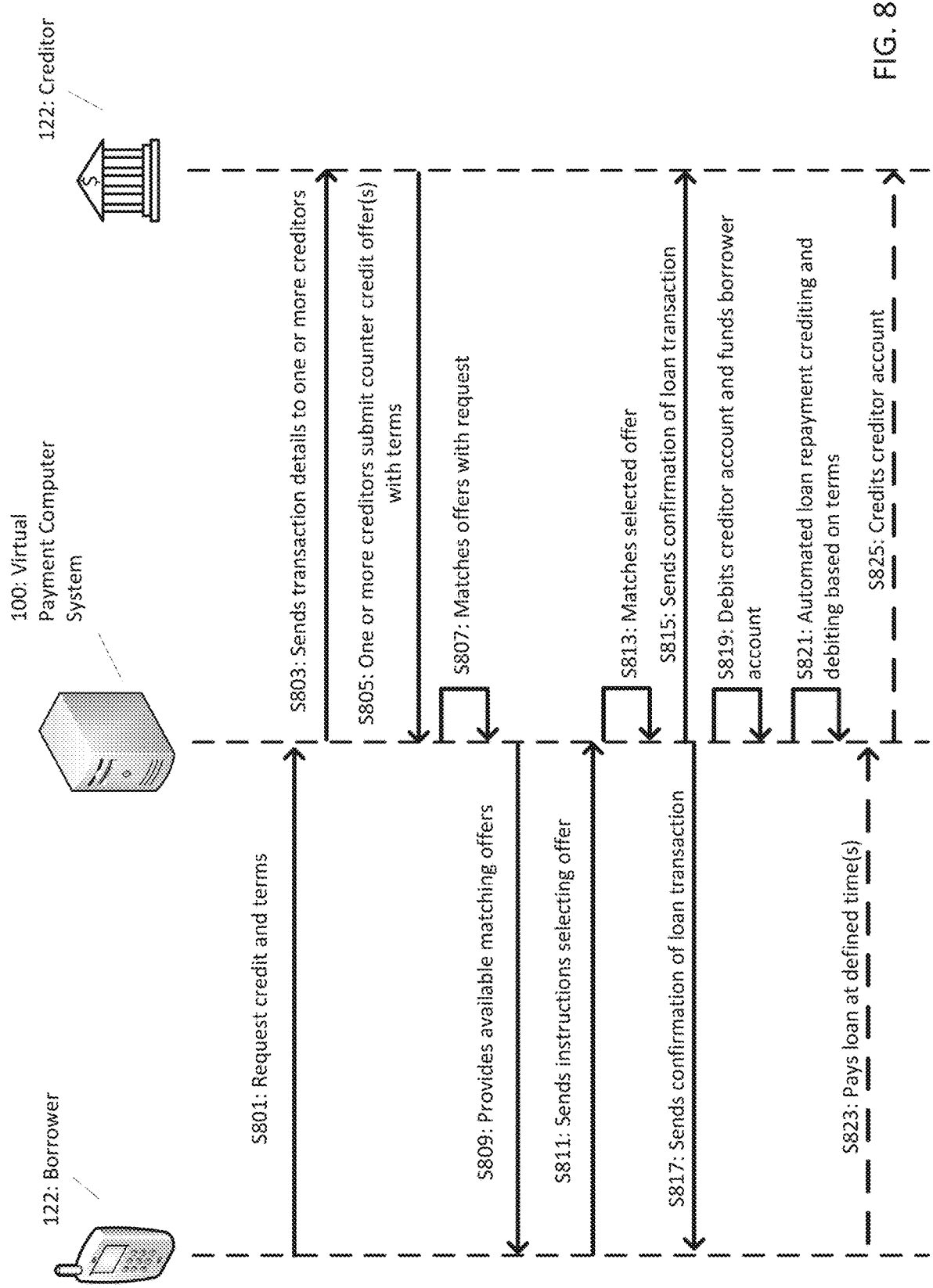
FIG. 8 is a diagram illustrating an example process of another credit transaction in accordance with the data transaction processing system.

FIG. 8 is a diagram illustrating an example process of another credit transaction in accordance with the electronic payment transaction network 101. In stage S801, borrower 122 requests credit with particular terms from virtual payment computer system 100. The request for credit may be associated with a transaction through system 100 or may be a request for credit that is not associated with any other transaction. The request may be directed to one or more specified creditors 122. The request may be directed towards only creditors with whom the borrower currently has obligations or has previously engaged in transactions. In stage S803, virtual payment computer system 100 sends received credit and terms to one or more creditors in stage S803. Creditors 122 send counter credit offers with terms to virtual payment computer system 100. Counteroffers are sent to system 100 in stage S805, and system 100 matches the newly proffered counter credit offer based terms of the offer in stage S807. In stage S809, system 100 provides available matching offers back to borrower 122. Borrower 122 selects one or more of the matching counteroffers in stage S811 and sends instructions selecting the offer with its corresponding unique transaction identifier to system 100. The transaction may be binding on the parties immediately upon borrower 122's acceptance. In stage S813, virtual payment computer system 100 matches the counteroffer accepted by borrower 122 and sends confirmation of the loan transaction to both creditor 122 and borrower 122 in stages S815 and S817. In stage S819, virtual payment computer system 100 debits the creditor account and funds the borrower account in accordance with the terms of the accepted loan transaction. A borrower 122 may be permitted to withdraw cash from system 100 based on the credit provided by accepted loan transaction. When repayment of the loan begins, virtual payment computer system 100 may automate loan repayment, crediting and of the appropriate accounts based on the terms of the loan transaction in stage S821. Borrower 122 may instruct virtual payment computer system 100 to pay the loan on a payment by payment basis instead of an automated loan repayment. In this event, in stage S823, borrower 122 sends instructions to credit creditor 122 to virtual payment computer system 100. Upon receipt of these instructions, virtual payment computer system 100 credits the creditors account based on the instructions in stage S825.

Figure 9:
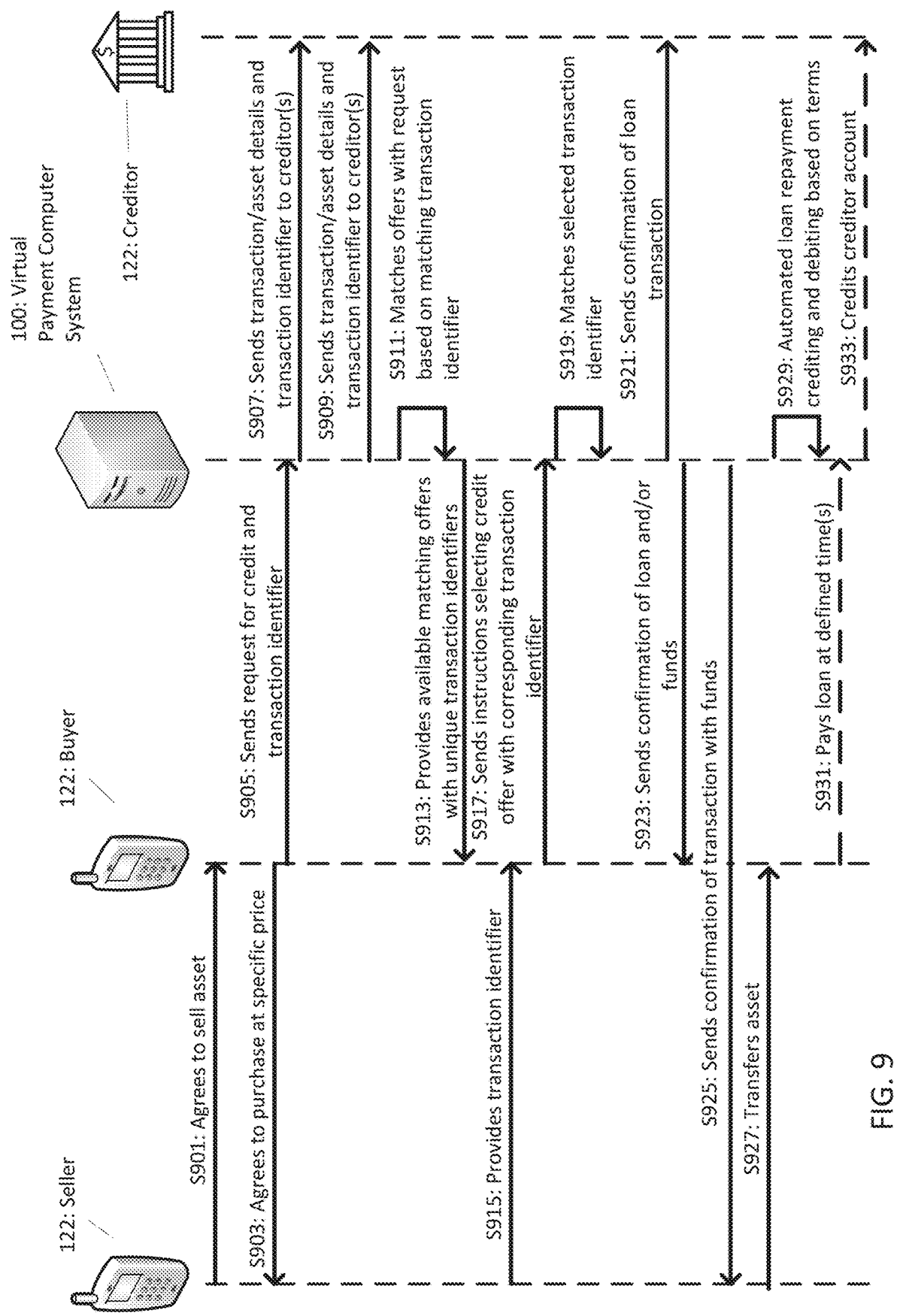
FIG. 9 is a diagram illustrating an example process of credit procurement in accordance with the data transaction processing system.

FIG. 9 is a diagram illustrating an example process of credit procurement in accordance with the electronic payment transaction network 101. In stage S901, seller 122 agrees to sell an asset to a buyer 122. Buyer 122 agrees to purchase the asset a specific price and with specific terms in stage S903 and communicates its agreement to seller 122. In stage S905, a seller provides a transaction identifier in stage S905 to buyer 122. In stage S907, buyer 122 sends a request for credit with the transaction identifier to virtual payment computer system 100. In stage S909, system 100 sends transaction and asset details along with the transaction identifier to creditor 122. In stage S911, system 100 matches offers for credit with the request for credit based on the matching transaction identifier. In stage S913, system 100 provides all available matching offers to buyer 122. Each matching offer may have its own unique transaction identifier. Buyer 122 selects one or more offers and sends instructions selecting the credit offer along with the corresponding unique transaction identifier to system 100 in stage S915. System 100 matches the selected offers based on the unique transaction identifiers in stage S917. System 100 sends confirmation of the loans and/or funds transaction to both creditor 122 and buyer 122 in stages S919 and S921. System 100 sends confirmation of the completion of a transaction in stage S923 to seller 122. Upon receipt of confirmation, seller 122 then transfers the assets in stage S925 to buyer 122. The loan repayment to may occur in an automated manner crediting and debiting the appropriate account based on the terms of the credit offer in stage S927. Additionally or alternatively, buyer 122 sends instructions to transfer funds at one or more intervals of time in order to repay the loan in stage S929 by sending instructions to transfer funds to system 100. Upon receipt of payment instructions from buyer 122 or based on automated loan repayment, system 100 credits the creditor account in stage S931. Assets transferred may be secured through system 100. A seller and buyer may deposit asset documentation, such as a title or other document of ownership that may be held by system 100 or transferred through system 100 to a creditor. The asset may be centrally held by system 100 although multiple creditors are providing credit for the transaction. The account value of a user may reflect assets held by system 100 associated with an account.

Figure 6:
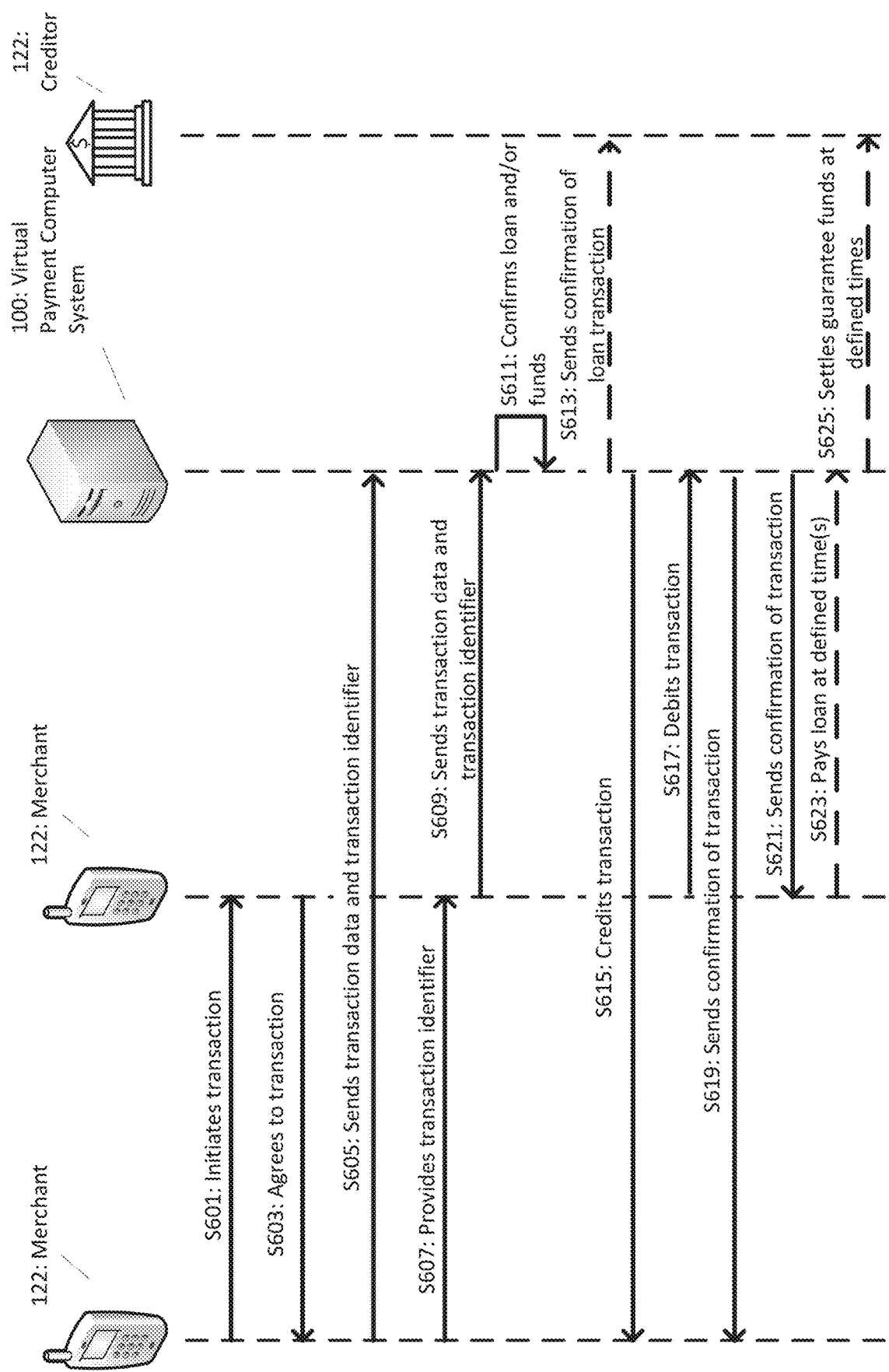
FIG. 6 is a diagram illustrating an example process of a merchant to merchant transaction in accordance with the data transaction processing system.

FIG. 6 is a diagram illustrating an example process of a merchant to merchant transaction in accordance with the electronic payment transaction network 101. In stage S601, merchant 122 initiates a transaction, and in stage S603, merchant 122 agrees to the transaction. In S605, the initiating merchant 122 sends transaction data and a transaction identifier to virtual payment computer system 100. An identical transaction identifier is sent to the agreeing merchant 122. The agreeing merchant sends instructions to settle the transaction along with the identical transaction identifier to system 100. Virtual payment computer system 100 confirms the transaction based on the identical transaction identifier received from each of the merchants and confirms that the necessary credit, account balance, or other details are present in the accounts of both participating merchants 122. The transaction may include a credit component. If so, in stage S613, system 100 sends confirmation of the loan transaction to creditor 122. The merchant 122 receives funds for the transaction in S615 and the other merchant party is debited for the transaction in S617. System 100 sends confirmation of the transaction in stages S619 and S621 to each of the merchants 122. The repayment of any credit based aspects of the transaction are conducted in stage S623 as merchant 122 pays back the loan at the agreed upon intervals and in stage S625, virtual payment computer system 100 settles guarantee funds with creditor 122 at the agreed upon intervals.

Figure 10:
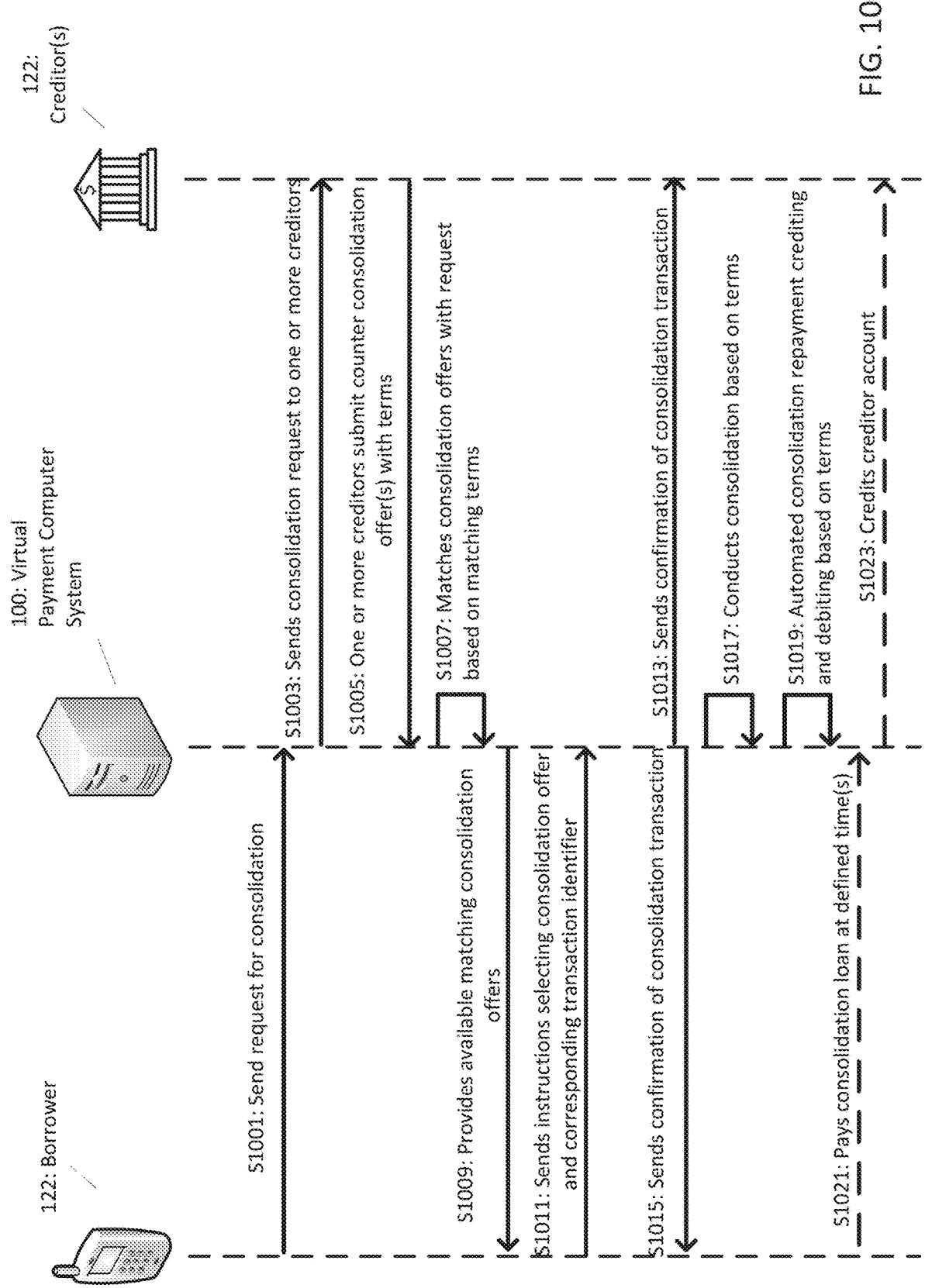
FIG. 10 is a diagram illustrating an example process of debt consolidation in accordance with the data transaction processing system.

FIG. 10 is a diagram illustrating an example process of debt consolidation in accordance with the electronic payment transaction network 101. At stage S1001, borrower 122 sends a request for a loan consolidation along to virtual payment computer system 100. At stage S1003, system 100 sends a consolidation request to one or more creditors 122. One or more of the creditors 122 submit counter consolidation offers with terms in stage 51005 to system 100. In stage 51007, system 100 matches the consolidation offer based on terms that match the original request sent by borrower 122. The terms may include credit score, minimum and/or maximum interest, length of loan, fees, additional payments or other terms. System 100 then provides all available matching the consolidation offers to borrower 122 in stage S1009. In stage S1011, borrower 122 selects one or more consolidation offer and sends instructions to system 100 to accept the counter consolidation offer. In some embodiments, instead of providing consolidation offers to the borrower 122 for selection, system 100 may automatically match the request for consolidation with existing offers for consolidation that are stored in transaction message database 108. Matched requests may be based on the lowest offer for interest, minimum fee, credit rating, first offer in time, or other criteria. Matched requests may be weighted based on multiple parameters. For example, credit score of the consolidating user, amount of loan, or other criteria may be heavily weighted. In stage S1013, and stage S1015, system 100 sends confirmation of the consolidation transaction to both creditor 122 and borrower 122. In stage S1017, system 100 consolidates borrower 122 loans based on the agreed terms. Loan repayment may be conducted using an automated consolidation repayment in stage S1019 with system 100 automatically crediting and debiting the accounts based on terms of the agreement. Additionally or alternatively, borrower 122 may pay some or all of the consolidation loan payments in stage S1021. Upon receipt of instructions from the borrower 122 or upon automated consolidation terms, system 100 credits creditor 122's account in stage S1023.

Figure 11:
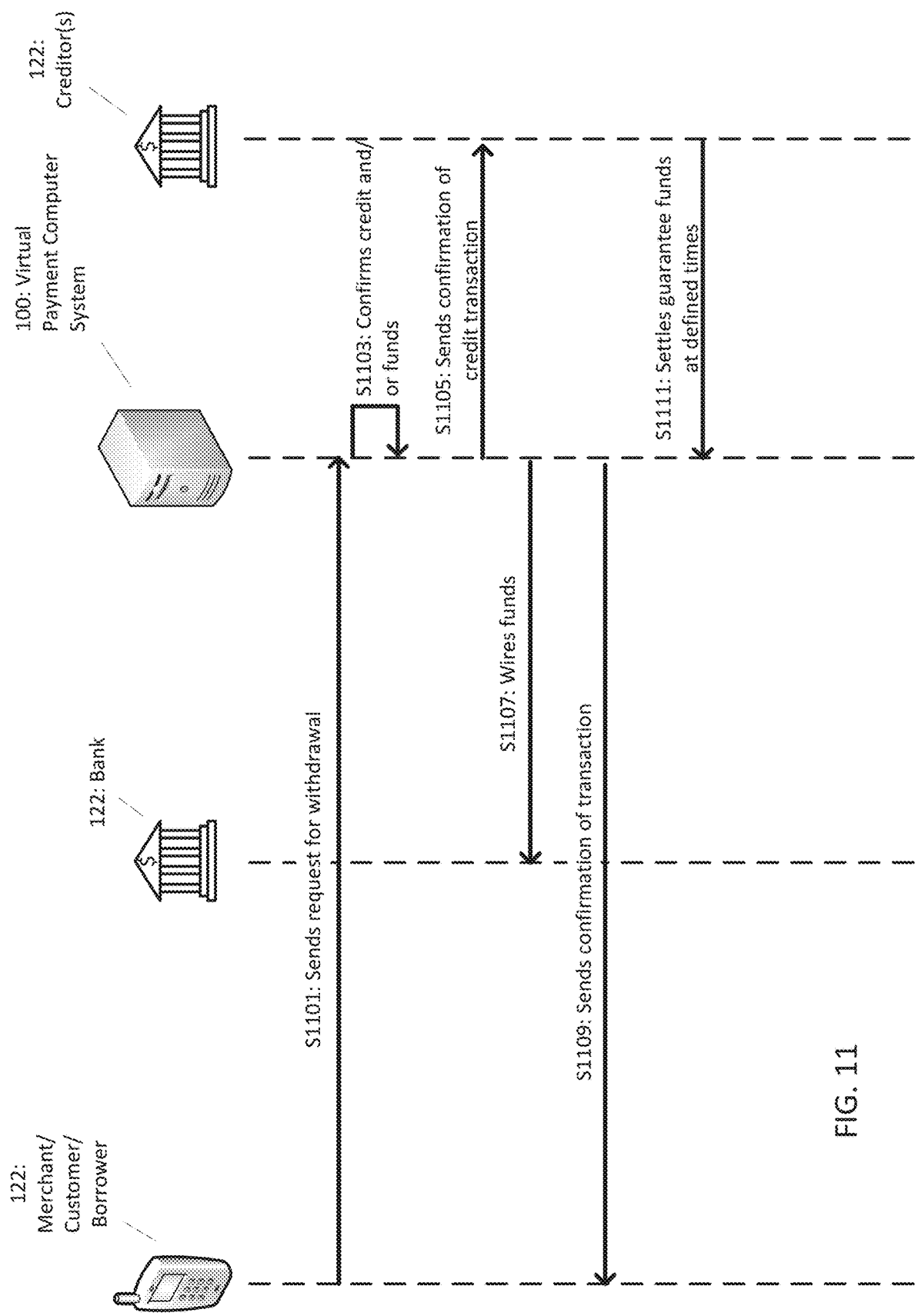
FIG. 11 is a diagram illustrating an example process of a cash out transaction in accordance with the data transaction processing system.

FIG. 11 is a diagram illustrating an example process of a cash out transaction in accordance with the electronic payment transaction network 101. In stage S1101, merchant/customer 122 sends a request for withdrawal from virtual payment computer system 100. In S1103, system 100 confirms credit and/or funds of the requesting merchant or customer 122. In stage S1105 system 100 sends confirmation for the credit transaction paying any outstanding debts in full for a merchant or customer 122's account with system 100. Cashing out may require that the merchant/customer 122 settle the account in full, and may require the merchant/customer 122 to conduct a wire transfer of funds from the user's bank 122 to system 100 to pay any outstanding debt. In stage S1107, system 100 wires the remaining funds in merchant or customer account 122 to a corresponding merchant or customer 122's account at bank 122. Upon completion of the wire transfer in repayment of outstanding loans, system 100 sends confirmation of the transaction in stage S1109 to merchant or customer 122. In stage S1111, creditor 122 settles guaranty funds with system 100. System 100 may require merchant/customer 122 suspend, case out, or close a user's account if failure to make payments, failure to maintain required risk of loss amounts, or bankruptcy occurs.

Figure 12:
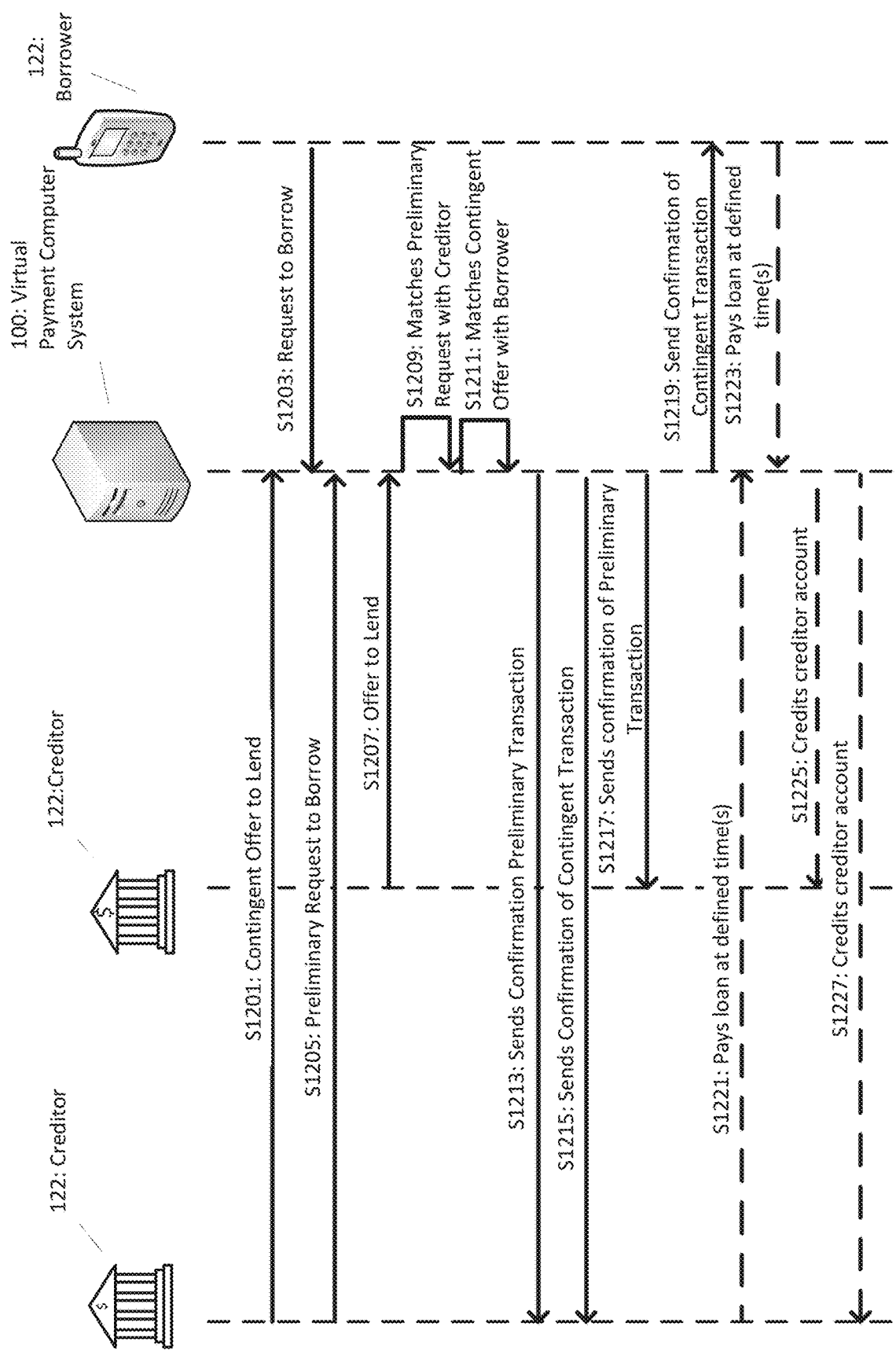
FIG. 12 is a diagram illustrating an example process of another credit transaction in accordance with the data transaction processing system.

FIG. 12 is a diagram illustrating an example process of a credit transaction in accordance with the data transaction processing system such as the virtual payment computer system 100. In stage S1201, a contingent offer to lend is made by creditor 122 from a client device of the creditor 122 and sent to virtual payment computer system 100. In stage S1203, a request to borrow is made by borrower 122 and sent from a client device of borrower 122 to the system 100. In stage S1205, a preliminary request to borrow is made by creditor 122 from a client device of creditor 122 and sent to the system 100. An offer to lend is made from a creditor 122 differing from the creditor 122 making the contingent offer to lend in stage S1207, sending the offer to lend to system 100. In stage S1209, the system 100 matches the preliminary request to borrow from creditor 122 with a compatible offer to lend from the differing creditor 122.

In stage S1211, the system 100 matches the contingent offer from the offering creditor 122 to a compatible offer to lend from borrower 122. In stage S1213, the system 100 sends confirmation of resolution of the preliminary transaction to at least the participant making the preliminary request to borrow. In stage S1215, the system 100 sends confirmation of resolution of the contingent transaction to at least the participant making the offer to lend. In stage S1217, the system 100 sends confirmation of the resolution of the preliminary transaction to the participant with an offer to lend that is compatible with the preliminary request to borrow. In stage S1219, the system 100 sends confirmation of the resolution of the contingent transaction to the participant making a request to borrow that is compatible with the contingent offer to lend.

System 100 debits the participants with an obligation to pay in stages S1221 and S1223. Based on the terms established the loan automated loan repayment, the loan may be repaid automatically in stages S1221 and S1219 without further instruction by borrower 122 and/or creditor 122 via system 100. Additionally or alternatively, borrower 122 and/or creditor 122 send funds to pay the loan at predetermined times based on the loan terms. Borrower 122 and/or creditor 122 may provide repayment of the loan to virtual payment computer system 100, and in stages S1225 and S1227 virtual payment computer system 100 credits the creditor 122 accounts holding the obligations to be repaid based on the contingent and preliminary transactions. Because the credit transaction occurs through system 100, one or more of the participants in the contingent and preliminary transactions may remain anonymous.

Figure 13:
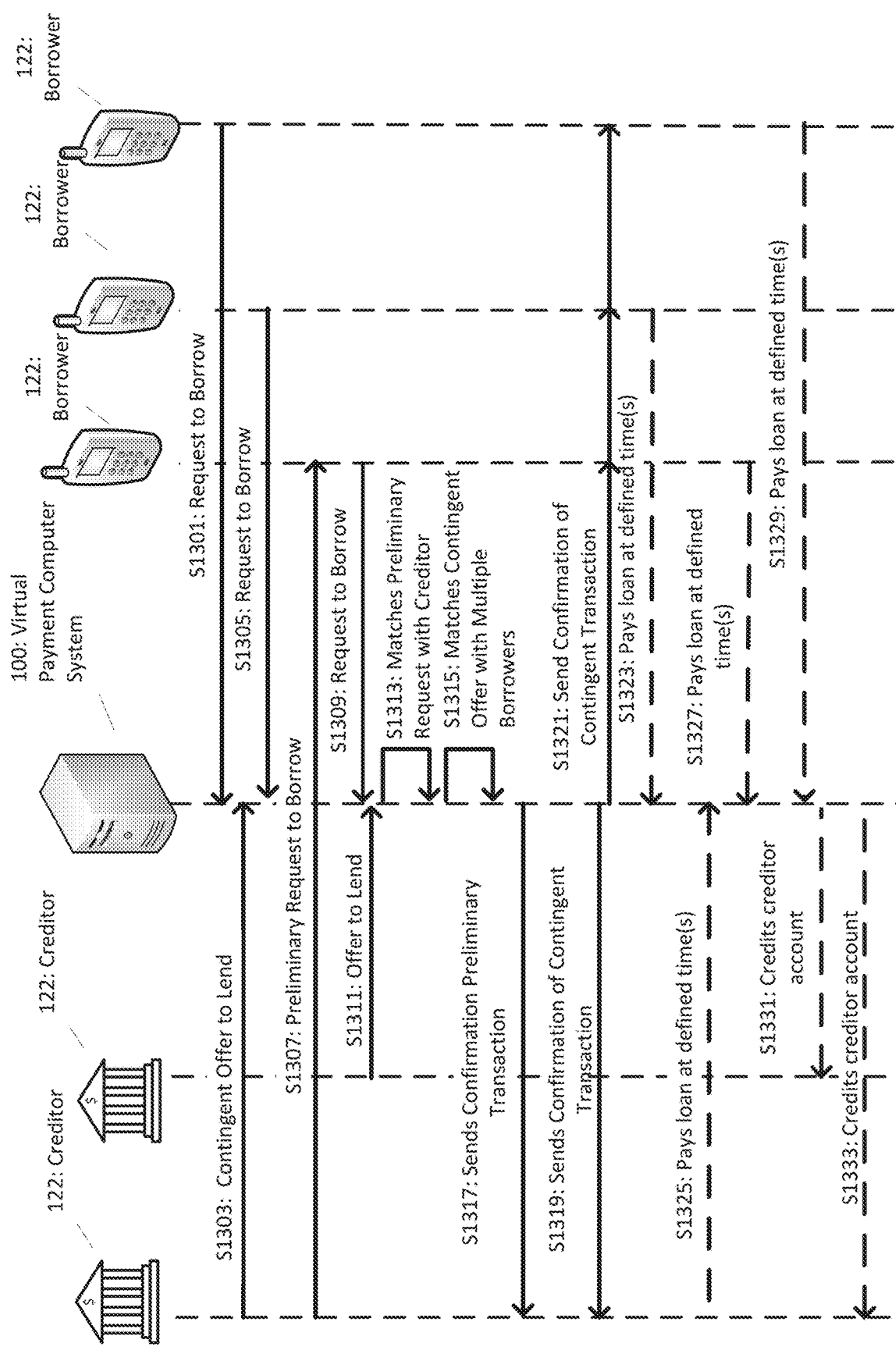
FIG. 13 is a diagram illustrating an example process of another credit transaction in accordance with the data transaction processing system.

FIG. 13 is a diagram illustrating an example process of another credit transaction in accordance with the data transaction processing system. In stages S1301, S1305, and S1309, requests to borrow are made by different borrowers 122 and sent from the respective client device of each borrower 122 to the virtual payment data computer system 100. In stage S1303, a contingent offer to lend is made by creditor 122 from a client device of the creditor 122 and sent to virtual payment computer system 100. In stage S1307, a preliminary request to borrow is made by creditor 122 from a client device of creditor 122 and sent to the system 100. An offer to lend is made from a creditor 122 differing from the creditor 122 making the contingent offer to lend in stage S1311, sending the offer to lend to system 100. In stage S1313, the system 100 matches the preliminary request to borrow from creditor 122 with a compatible offer to lend from the differing creditor 122. In stage S1315, the system 100 matches the contingent offer from the offering creditor 122 to multiple requests to borrow from multiple borrowers 122. The aggregate of the multiple requests to borrow are compatible to the contingent offer to lend. In stage S1317, the system 100 sends confirmation of resolution of the preliminary transaction to at least the participant making the preliminary request to borrow. In stage S1319, the system 100 sends confirmation of resolution of the contingent transaction to at least the participant making the contingent offer to lend. In stage S1321, the system 100 sends confirmation of the resolution of the preliminary transaction to each of the participants whose offer to lend is compatible (in the aggregate) with the preliminary request to borrow.

System 100 debits the participants with an obligation to pay in stages S1323, S1325, S1327, and S1329. Based on the terms established the loan automated loan repayment, the loan may be repaid automatically in stages S1323, S1325, S1327, and S1329 without further instruction by borrowers 122 and/or creditor 122 via system 100. Additionally or alternatively, borrowers 122 and/or creditor 122 send funds to pay the loan at predetermined times based on the loan terms. Borrower 122 and/or creditor 122 may provide repayment of the loan to virtual payment computer system 100, and in stages S1331 and S1333, virtual payment computer system 100 credits the creditor 122 accounts holding the obligations to be repaid based on the contingent and preliminary transactions. Because the credit transaction occurs through system 100, one or more of the participants in the contingent and preliminary transactions may remain anonymous.

Figure 14:
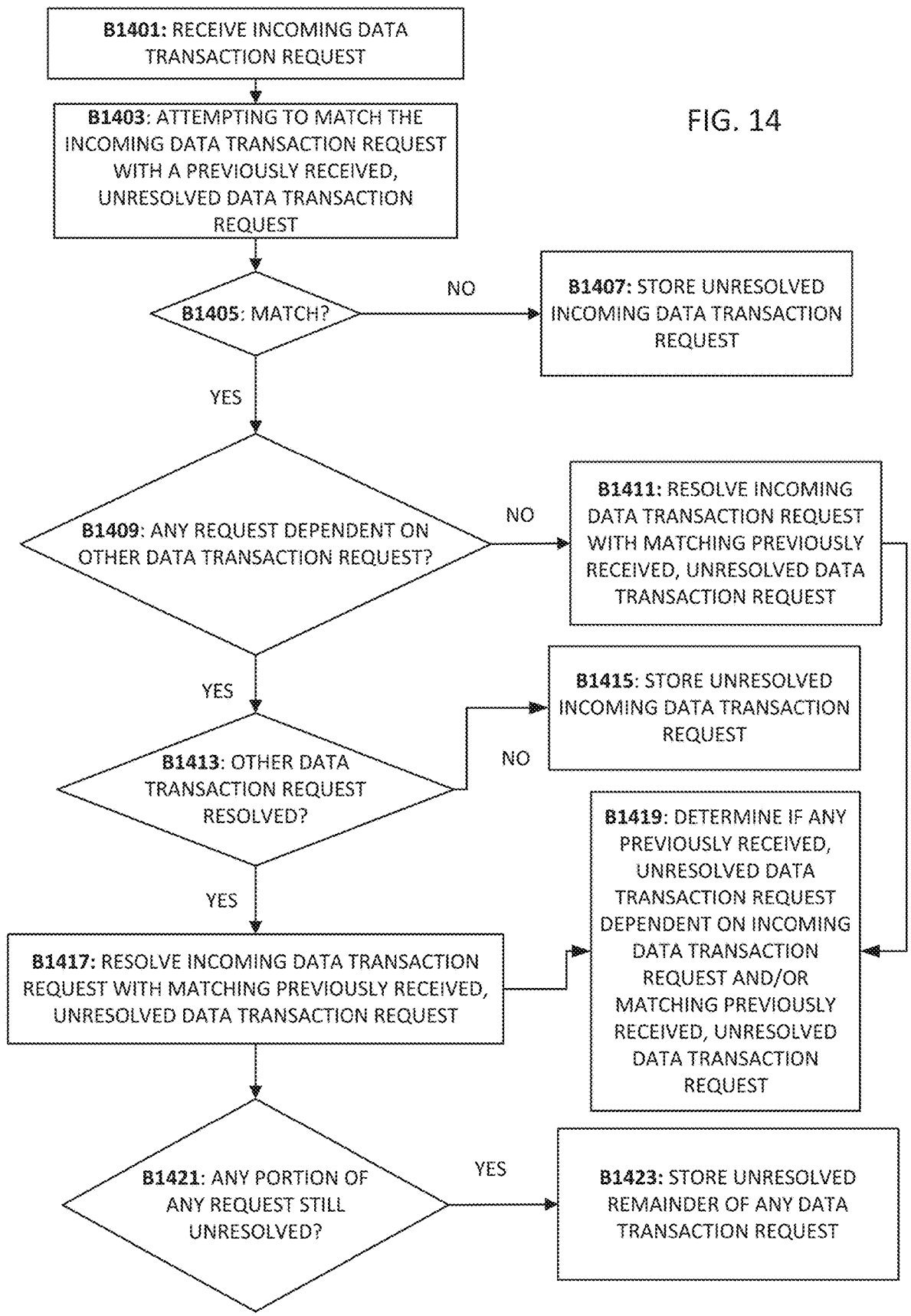
FIG. 14 is a flow diagram illustrating an example process of resolving data transaction requests in accordance with the data transaction processing system.

FIG. 14 is a flow diagram illustrating an example process of resolving a data transaction requests by virtual payment system 100. In block B1401, an incoming data transaction request from a client device or computer 116, 118, 120, or 122 of a creditor or other transaction participant is received by a hardware matching processor of system 100. The incoming data transaction request contains data indicative of a data transaction. The incoming data transaction may or may not include transactions that require the resolution of another data transaction request before the incoming data transaction request can be resolved. The incoming data transaction request may identify the data transaction request on which it is dependent via a data transaction identifier included in the incoming data transaction request. The incoming data transaction request may contain additional data records indicative of terms associated with the other data transaction requests on which it is dependent. Data indicative of the transaction requests may include data such as a transaction agreement, an agreed value, an agreed present value, an interest rate, a value with an associated interest rate or a value with an associated generic index reference, a date, a future date, span of time, a future time, a transaction expiration time, or data associated with a transaction request on which the incoming data transaction request is dependent. Data transaction requests contingent on the resolution of additional data transaction requests provide a mechanism for hedging or pre-securitization of a creditor for its obligation in the market. Data transaction requests may be resolved with multiple matched data transactions to produce more favorable results through a combination of matches.

For example, a term of the incoming data transaction may require that the data transaction on which it depends is resolved on or before a transaction expiration time. If the data transaction is resolved after the transaction expiration time, the incoming data transaction may not be resolved by the matching processor of system 100, and a message may be sent from system 100 to a client device of the entity associated with the incoming data transaction. The message may indicate that the incoming data transaction request has failed and may indicate the basis for failure. The message may further specify that the underlying data transaction request has been resolved after the transaction expiration time, or the message may specify that the transaction expiration time has passed without resolution of the data transaction request on which the incoming data transaction request depends.

In block B1403, the hardware matching processor 112 of system 100 attempts to match the incoming data transaction request with a previously received, unresolved data transaction request sent from a client device or computer associated with another entity. Previously received, unresolved data transaction requests may be stored in a transaction message database 108 coupled with the hardware matching processor of system 100. Previously received but not yet resolved data transaction requests may have been submitted at any previous time and are unresolved at the time when system 100 receives the incoming data transaction request. Data transaction requests with dependencies may originate from the same participant and may be sent from the same client device or computer associated with the entity or may be sent from different client devices or computers. An incoming data transaction request may be dependent on a data transaction request that is sent before or after the incoming data transaction request. That is, a data transaction request that must be resolved as a prerequisite of the incoming data transaction request may be sent before, after, or at substantially the same time.

Resolution of a data transaction may include resolution of both the incoming transaction request and the matched transaction. One or both of the transaction requests may be partially resolved, leaving an unresolved remainder of the incoming data transaction request or of the matching previously received but not yet resolved data transaction request.

If the incoming data transaction request cannot be matched by hardware matching processor 112 with a previously received, unresolved data transaction request in block B1405, the incoming data transaction request is stored in the transaction message database 108 block B1407.

If all or at least one portions of the incoming data transaction request is matched in block B1405, the hardware matching engine 112 determines whether the resolution of the incoming data transaction request and/or any matching previously received but not yet resolved data transaction request is further dependent on the resolution of another data transaction request in B1409. The incoming data transaction request or the matched previously received but not yet resolved data transaction request either or both contingent on another data transaction request that may have already been resolved or may be unresolved and stored in the transaction message database, and/or may be contingent on another data transaction request that has not yet been received by the hardware matching processor.

The matching processor 112 determines whether the other data transaction request has been resolved in block B1413. Match processor 112 may determine whether the other data transaction request has been resolved by checking a completed transaction database storing data records of resolved data transaction request. The completed transaction database may store data records of data transaction requests that are partially resolved. If the other data transaction request has not been resolved, the hardware match processor 112 stores the unresolved incoming data transaction request in the transaction message database 108 in block B1415.

If the other data transaction request has been resolved in block B1413, the hardware matching engine processor 112 resolves the incoming data transaction request with the matching, previously received but not yet resolved data transaction request in block B1417.

Upon resolution of the incoming data transaction request with matching previously received but not yet resolved data transaction request (as in block B1417 and/or block B1411), the hardware matching processor 112 determines whether there are any remaining other previously received but not yet resolved data transaction requests stored in the transaction message database which are dependent on the resolution of the incoming data transaction request and/or the matching previously received but not yet resolved data transaction request in block B1419. Any data transaction requests dependent on the now resolved incoming data transaction request or now resolved, previously received but not yet resolved data transaction requests are resolved following block B1419. The incoming data transaction requests and some previously received but not yet resolved data transaction requests may not be contingent on the resolution any other data transactions, and may thus be resolved following the matching process. Unresolved data transaction requests stored in the transaction message database may be periodically resubmitted to the match processor 112 to determine whether data transaction requests were received after the unresolved data transaction request was stored in the transaction message database. Resubmission may be specified as a regularly scheduled event, periodic based on the time of receipt, and/or scheduled based on availability of the match processor incoming data transaction request traffic. The resubmission process may treat resubmitted requests in the same manner as any other incoming request. Linear optimization techniques may be used to determine which requests should be resolved upon matching of multiple requests that cannot all be resolved. Linear optimization may be based on the original time order of receipt.

In block B1421, the hardware matching processor 112 determines whether any portion of the incoming data transaction request and/or the previously received but not yet resolved data transaction request remain unresolved. In block B1423, any unresolved remainders of the incoming data transaction request and/or the previously received but not yet resolved data transaction request are stored by hardware matching processor 112 in the transaction message database.

The incoming data transaction request is resolved with its matching previously received, unresolved data transaction request upon determination that no other data requests request are dependent on the incoming data transaction request or the matching previously received but not yet resolved data transaction request. An incoming data transaction request and any contingent data transaction requests may each be matched with data transaction requests originating from different entities. That is, the previously received but not resolved data transaction request may originate from an entity differing from the entity associated with a matched data transaction request, even though both data transaction requests are associated with the same incoming data transaction request. Matched participants to the incoming data transaction request may not receive any information indicating that one transaction is dependent on another. A data transaction identifier sent as part of a data transaction request may not contain identifying account data associated with any entities.

The virtual payment computer system 100 may control or limit data transactions containing contingencies via thresholding. For example, a maximum number of unresolved data transactions may be limited for each participant. Contingent data transactions may additionally or alternatively be limited by a total maximum monetary amount of unresolved contingent data transactions per participant. Maximums may be based on total unresolved transactions and/or new transactions per day for each participant. Maximums or thresholds may be varied between participants and determined based on the account value of the participant or user.

Incoming data transactions may be dependent on the resolution of multiple data transactions. That is, an incoming data transaction may be dependent on multiple data transactions that are otherwise unrelated. An incoming data transaction may be dependent on a chain of other data transactions. For example, a data transaction serving as a prerequisite transaction for an incoming transaction may further be contingent on the resolution of another data transaction.

An incoming or previously received data transaction request may be dependent on the resolution of another data transaction request that has not yet been received by the hardware matching processor. A data transaction request may be dependent on the resolution of a single other data transaction request, an incoming data transaction request, or another data transaction request that has not yet been received by the hardware matching processor. One or more data transaction request may be dependent on the resolution of multiple other data transaction requests, multiple incoming data transaction requests, multiple data transaction requests that have not yet been received by the hardware matching processor, or a combination thereof. One or more data transaction request may be dependent on a subset of multiple other data transaction requests, multiple incoming data transaction requests, multiple other data transaction requests that have not yet been received by the hardware matching processor, or a combination thereof. In some subsets, no data transaction request may be otherwise dependent on or depend from any data transaction request of the subset.

An incoming data transaction may be dependent on multiple data transactions of which one or more may be dependent on yet another data transaction. That is, an incoming data transaction may include one or both horizontal dependencies (dependency on multiple data transactions that are otherwise unrelated to one another) and vertical dependencies (a chain of data transactions, each dependent on another data transaction). If the incoming data transaction request matches with a previously received but not yet resolved data transaction request, and a second previously received but not yet resolved data transaction request depends from the previously received but not yet resolved data transaction request that was matched with the incoming data transaction request, the second previously received but not yet resolved data transaction request may be resolved with the first previously received but not yet resolved data transaction before the incoming data transaction request is resolved with the previously received but not yet resolved data transaction request. That is, the matching processor 112 may recognize a chain of dependent data transaction requests and resolve the dependent chain of transaction data requests in reverse order of the dependencies, causing a cascade of data transaction requests.

A data transaction that is contingent with another data transaction may include data records, such as a preliminary data transaction identifier, associated with each data transaction on which it is contingent or may contain only data transaction identifiers for data transactions on which it is horizontally dependent. Before a data transaction contingent on other data transactions may be resolved, all the dependent data transactions associated with the incoming data transaction (whether vertical or horizontal) must be resolved. If one or more data transactions have not been resolved, a failure message may be sent to the entity associated with the incoming data transaction. The failure message may identify the particular data transaction that has not been resolved or may identify whether the transaction failed due to the resolution of a particular data transaction after a data transaction expiration threshold. The incoming data transaction may include a data transaction expiration threshold for only some dependent transactions. The incoming data transaction may include a data transaction expiration that is identical for all dependent data transactions or may include individual expiration thresholds for each dependent data transaction.

The resolution of one or more dependent data transactions performed based on an optimization of interest rates or other terms. If the incoming data transaction request matches with multiple previously received but not yet resolved data transaction requests, but all portions of the multiple previously received but not yet resolved data transaction request cannot be resolved by the incoming data transaction request, the resolution of transactions may be optimized based on maximization of profit, minimization of cost, maximization of the number of matched transaction request, maximization of a monetary amount associated with the transaction requests, or a combination thereof. The match processor 112 may use a mathematical model employing linear optimization for requirements that are represented by linear relationships. Linear optimization techniques may obtain an optimization based on minimizing cost, maximizing profit, or maximizing or minimizing a specific term of transactions. Linear optimization may be implemented using standard form presenting a maximization or minimization function with problem constraints expressed as inequalities along with defined non-negative variables. Linear optimization may be implemented using augmented form using a maximization or minimization function with slack variables to convert inequalities to equations. Other linear optimization techniques such as duality or other known techniques may also be used. Other optimization technique to evaluate multiple dependencies may be used to determine the optimal match. Such optimization techniques may be employed only a potential match with multiple dependent transactions that cannot all be resolved. The data transactions and associated contingent data transactions may be resolved using a variety of ranges of terms, such that the one of the data transactions may be resolved at a lowest available interest rate, provided that the interest rate of the one data transaction remains lower than the interest rate specified in the other data transaction request. Terms of a data transaction may be resolved relative to one or more terms of another data transaction to ensure average weighted price, best price, relative interest rates and the like. One or more terms may have absolute values. Matching may additionally or alternatively include prioritization schemes such as FIFO or pro rata.

If one or both of the incoming data transaction request and/or the matched previously received but not yet resolved data transaction request are at least partially satisfied are resolved, the resolved portions of the data transaction requests may be removed from the transaction message database 108. A data record or log of the resolved portions of data transaction request may be stored in a completed transaction database which may be a separate portion of transaction message database 108 or may be a stored in a separate database. Time based entries associated with data transactions in the completed transaction database may be based on receipt of the data transaction by the system 100 or may be based on time of resolution.

In one example, the incoming data transaction request may be indicative of a bill for a meal at a restaurant that is to be split amongst the diners. The incoming data transaction request may be dependent on receipt of matching data transaction requests sent by each of the diners paying a portion of the bill. The full resolution of the incoming data transaction request may be dependent on receiving matching data transaction requests that at least total the amount of the bill or may be contingent on receiving matching data transaction requests for specific portions of the bill. The incoming data transaction request may be stored in the transaction message database 108 and updated as portions of the data transaction are resolved by each of the diners. Data associated with the remaining bill balance may be associated with the incoming data transaction request and updated on the transaction message database as each partial payment is received from each diner. Upon complete resolution of the bill, incoming data transaction request (and its matching data transaction requests constituting partial payment from multiple diners) may be removed from the transaction message database and a data record of the resolved data transaction request(s) may be stored in a completed transaction database.

Figure 15:
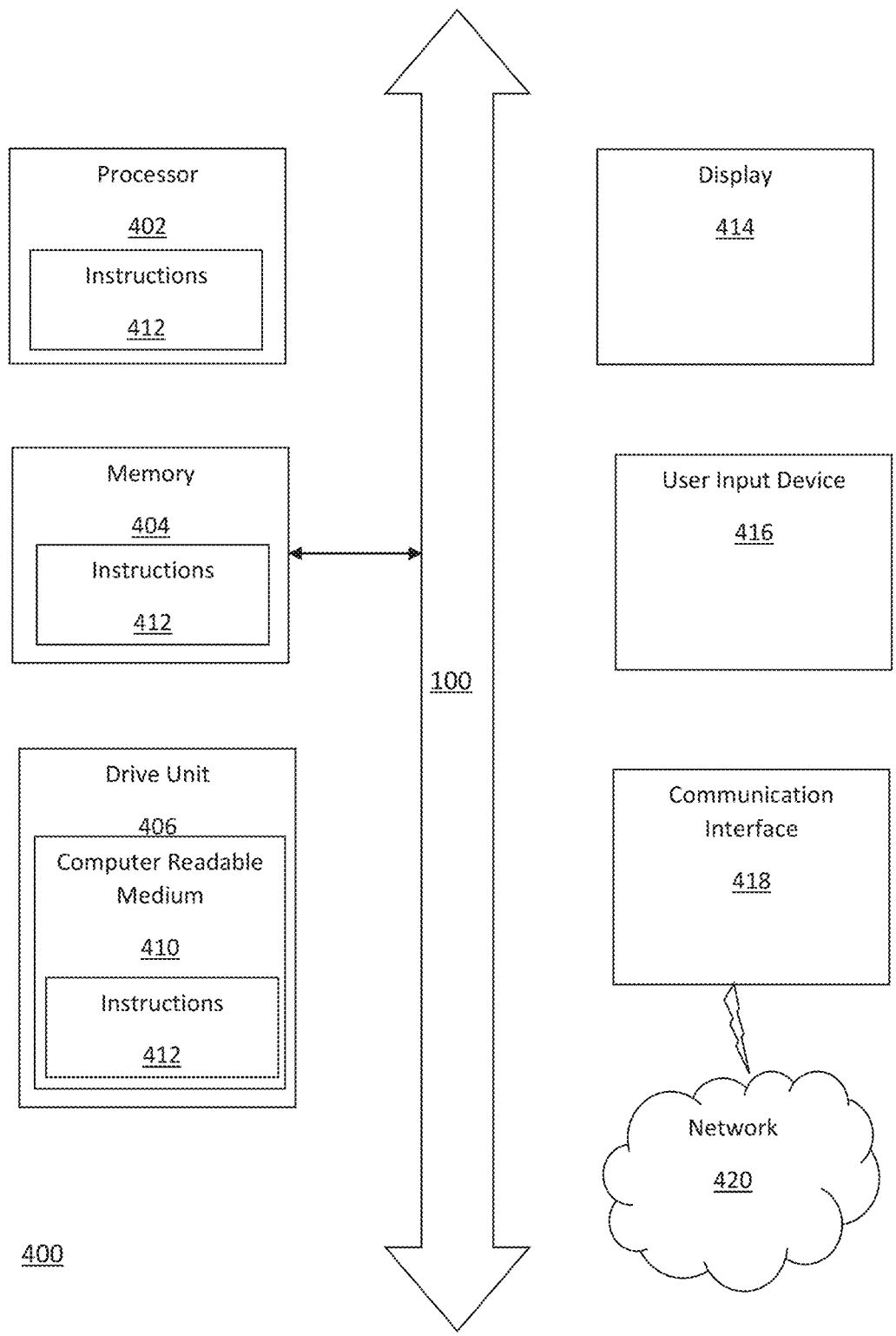
FIG. 15 shows an illustrative embodiment of a general computer system for use in accordance with the data transaction processing system.

FIG. 15 shows an illustrative embodiment of a general computer system for use with the electronic payment transaction network 101 of the disclosure. An illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a transaction identification engine, account update engine, payment or clearing function, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 15, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, content addressable memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc (CD), digital video disc (DVD), memory card, memory stick, floppy disc, universal serial bus (USB) memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 15, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method of resolving data transactions by a data transaction processing system in which data transactions are resolved by a hardware matching processor, the method comprising:
receiving, by the hardware matching processor, an incoming data transaction request from a first client device of a first entity via the data communications network, the incoming data transaction request containing data indicative of a first data transaction counter to a second data transaction from a second client device of a second entity, the second data transaction stored in a memory of the data transaction processing system, wherein the incoming data transaction request does not contain identifying information associated with the second entity and the second data transaction does not contain identifying information associated with the first entity;
matching, by the hardware matching processor, the first data transaction at least partially with the second data transaction;
resolving at least partially the incoming data transaction request and the second data transaction request, and storing any unresolved remainder of the first data transaction request or the second data transaction request in the memory;
generating one or more data transaction result messages comprising data indicative of the match; and
transmitting the generated one or more data transaction result messages to at least to the first client device via the data communications network.

2. The computer implemented method of claim 1, wherein the resolving further comprises:
removing the first data transaction and the second data transaction from the memory to the extent the first data transaction and the second data transaction request are fully or partially satisfied; and
creating positions in a position database for each transacting entity representative of an obligation entered into by each transacting entity by virtue of the matching of the first data transaction and the second data transaction.

3. The computer implemented method of claim 2, wherein at least one of the positions comprises an obligation to pay comprising at least an amount and a settlement date.

4. The computer implemented method of claim 2, wherein at least one of the positions comprises an entitlement comprising at least an amount and a settlement date.

5. The computer implemented method of claim 2, wherein at least one of the positions comprises an obligation to lend comprising at least an amount, a settlement data, and a lending rate.

6. The computer implemented method of claim 2, further comprising:
netting or offsetting one or more pre-existing positions in the position database for a transaction entity as a result of a new position created for the obligation or entitlement entered into by each transacting entity by virtue of the matching of the first data transaction and the second data transaction.

7. The computer implemented method of claim 2, further comprising:
charging one or more fees to one or more of the transacting entities.

8. A computer implemented method of resolving data transactions by a data transaction processing system in which data transactions are resolved by a hardware matching processor, the method comprising:
receiving, by the hardware matching processor, an incoming data transaction request from a first client device of a first entity via the data communications network, the incoming data transaction request containing data indicative of a first data transaction counter to a second data transaction from a second client device of a second entity, the second data transaction stored in a memory of the data transaction processing system, wherein the incoming data transaction request does not contain identifying information associated with the second entity and the second data transaction does not contain identifying information associated with the first entity;
matching, by the hardware matching processor, the first data transaction at least partially with the second data transaction;
identifying that the first data transaction and/or second data transaction is dependent on resolution of another data transaction request and further determining that the other data transaction request has been resolved;
resolving at least partially the incoming data transaction request and the second data transaction request, and storing any unresolved remainder of the first data transaction request or the second data transaction request in the memory;
generating one or more data transaction result messages comprising data indicative of the match; and
transmitting the generated one or more data transaction result messages to at least to the first client device via the data communications network.

9. The computer implemented method of claim 8, wherein the resolving further comprises:
removing the first data transaction and the second data transaction from the memory to the extent the first data transaction and the second data transaction request are fully or partially satisfied; and
creating positions in a position database for each transacting entity representative of the obligation or entitlement entered into by the transacting entity by virtue of the matching of the first data transaction and the second data transaction.

10. The computer implemented method of claim 8, further comprising:
netting or offsetting one or more pre-existing positions in the position database for a transaction entity as a result of a new position created for the obligation or entitlement entered into by the transacting entity by virtue of the matching of the first data transaction and the second data transaction.

11. The computer implemented method of claim 8, wherein the other data transaction request is a credit transaction.

12. A computer implemented method of resolving data transactions by a data transaction processing system in which data transactions are resolved by a hardware matching processor, the method comprising:
- receiving, by the hardware matching processor, a first incoming data transaction request from a first client device of a first entity via the data communications network, the first incoming data transaction request containing data indicative of a first data transaction counter to a second data transaction from a second client device of a second entity, wherein the incoming data transaction request does not contain identifying information associated with the second entity;
- storing, by the hardware matching processor, the first data transaction in a memory;
- receiving, by the hardware matching process, a second incoming data transaction request from a second client device of the second entity via the data communications network, the second incoming data transaction request containing data indicative of the second data transaction counter to the first data transaction, wherein the second incoming data transaction request does not contain identifying information associated with the first entity;
- matching, by the hardware matching processor, the second data transaction at least partially with the first data transaction stored in memory;
- resolving at least partially the first data transaction request and the second data transaction, and storing any unresolved remainder of the first data transaction or the second data transaction in the memory;
- generating one or more data transaction result messages comprising data indicative of the match; and
- transmitting the generated one or more data transaction result messages to at least to the first client device via the data communications network.

13. The computer implemented method of claim 12, wherein the first data transaction comprises an offer to provide credit comprising at least an amount and an interest rate.

14. The computer implemented method of claim 13, wherein the first data transaction further comprises a credit rating requirement.

15. A computer implemented method of resolving data transactions by a data transaction processing system in which data transactions are resolved by a hardware matching processor, the method comprising:
- receiving, by the hardware matching processor, an incoming data transaction request from a first entity via the data communications network, the incoming data transaction request containing data indicative of a first data transaction and a first transaction identifier unique to the first data transaction;
- identifying, by the hardware matching processor, using the first transaction identifier, a second data transaction from a second entity counter to the first data transaction; wherein the incoming data transaction request does not contain identifying information associated with the second entity and the second data transaction does not contain identifying information associated with the first entity;
- matching, by the hardware matching processor, the first data transaction at least partially with the second data transaction;
- resolving at least partially the incoming data transaction request and the second data transaction request, and storing any unresolved remainder of the first data transaction request or the second data transaction request in the memory;
- generating one or more data transaction result messages comprising data indicative of the match; and
- transmitting the generated one or more data transaction result messages to at least to the first client device via the data communications network.

16. The computer implemented method of claim 15, wherein the first transaction identifier is derived from a bar code.

17. The computer implemented method of claim 15, wherein the first transaction identifier is generated by the first entity and shared, by the first entity, with the second entity.

18. The computer implemented method of claim 15, wherein resolving comprises:
- transferring funds between an account associated with the first entity and the second entity.

19. The computer implemented method of claim 15, wherein the first data transaction dependent on the resolution of another data transaction, wherein the incoming data transaction request further contains data indicate of a unique transaction identifier for the other data transaction.

20. The computer implemented method of claim 19, wherein the other data transaction is a credit transaction.

* * * * *